United States Patent
Banerjee et al.

(10) Patent No.: US 11,924,611 B2
(45) Date of Patent: Mar. 5, 2024

(54) ARTIFICIAL COCHLEA FOR MECHANICAL PROCESSING OF SOUND

(71) Applicant: University of South Carolina, Columbia, SC (US)

(72) Inventors: Sourav Banerjee, Irmo, SC (US); Mohammad Sadegh Saadatzi, Columbia, SC (US)

(73) Assignee: University of South Carolina, Columbia, SC (US)

( * ) Notice: Subject to any disclaimer, the term of this patent is extended or adjusted under 35 U.S.C. 154(b) by 127 days.

(21) Appl. No.: 17/719,485

(22) Filed: Apr. 13, 2022

(65) Prior Publication Data
US 2022/0345830 A1    Oct. 27, 2022

Related U.S. Application Data

(60) Provisional application No. 63/174,629, filed on Apr. 14, 2021.

(51) Int. Cl.
*H04R 25/02* (2006.01)
*H04R 25/00* (2006.01)
*H04R 31/00* (2006.01)

(52) U.S. Cl.
CPC ........... *H04R 25/02* (2013.01); *H04R 25/402* (2013.01); *H04R 25/606* (2013.01); *H04R 31/00* (2013.01); *H04R 2225/67* (2013.01)

(58) Field of Classification Search
CPC .... H04R 25/02; H04R 25/402; H04R 25/606; H04R 31/00; H04R 2225/67; A61N 1/0541; A61N 1/36038; G01H 11/08
USPC .......................................... 381/312; 607/137
See application file for complete search history.

(56) References Cited

U.S. PATENT DOCUMENTS 5,856,722 A * 1/1999 Haronian ................. H03H 9/50
                                                                        310/309
9,789,311 B1 * 10/2017 Downs, Jr. ......... A61N 1/36036

* cited by examiner

*Primary Examiner* — Norman Yu
(74) *Attorney, Agent, or Firm* — Burr & Forman LLP; Douglas L. Lineberry

(57) ABSTRACT

Described herein are bio-inspired acoustic bandpass sensors with a user-defined range of frequencies mimicking the geometric structure of a human's basilar membrane to capture infrasonic, sonic or ultrasonic waves per design with a target frequency range for a specific application and methods of making same.

20 Claims, 16 Drawing Sheets

(a)

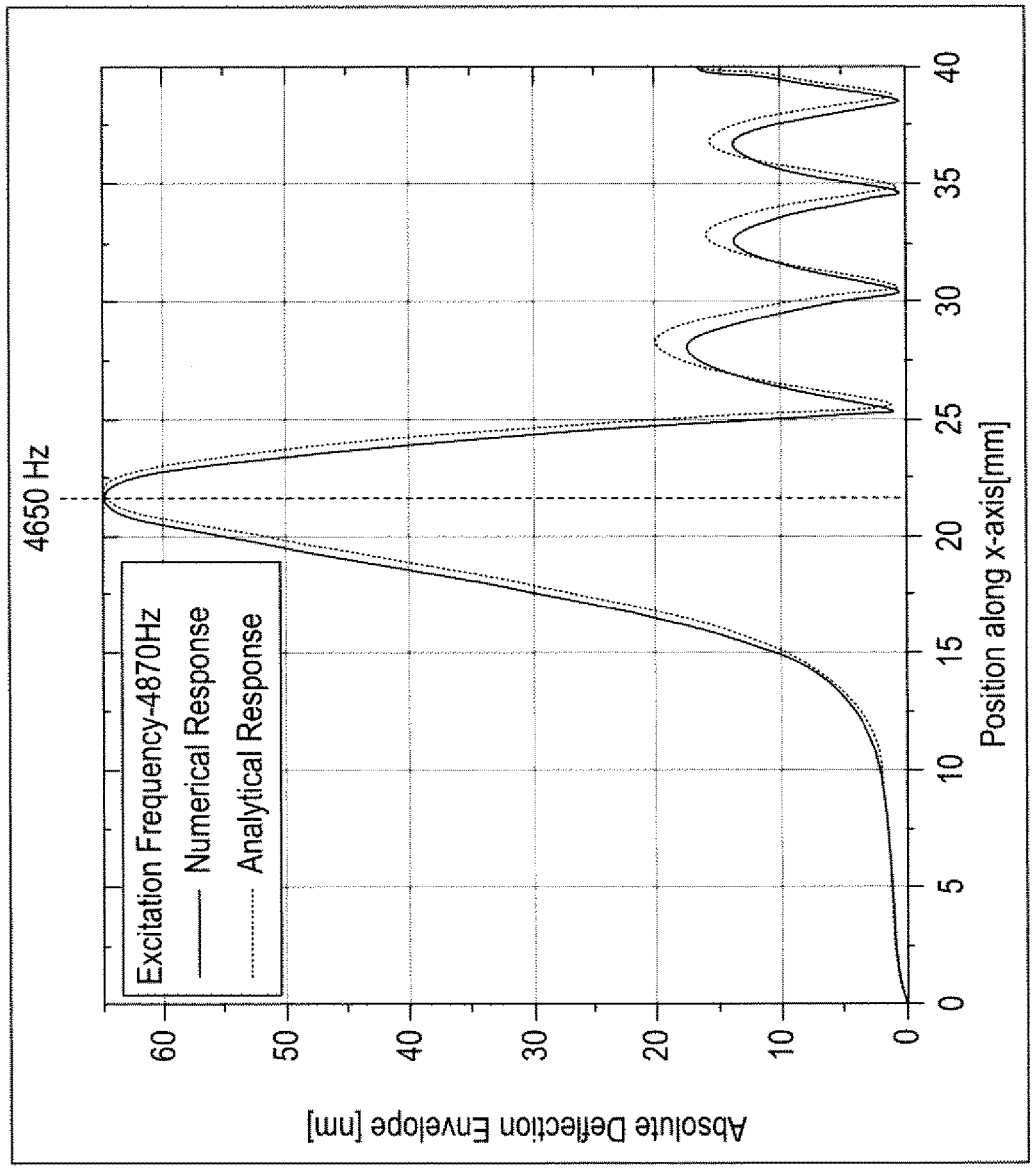
(b)
FIG. 7 (con't)

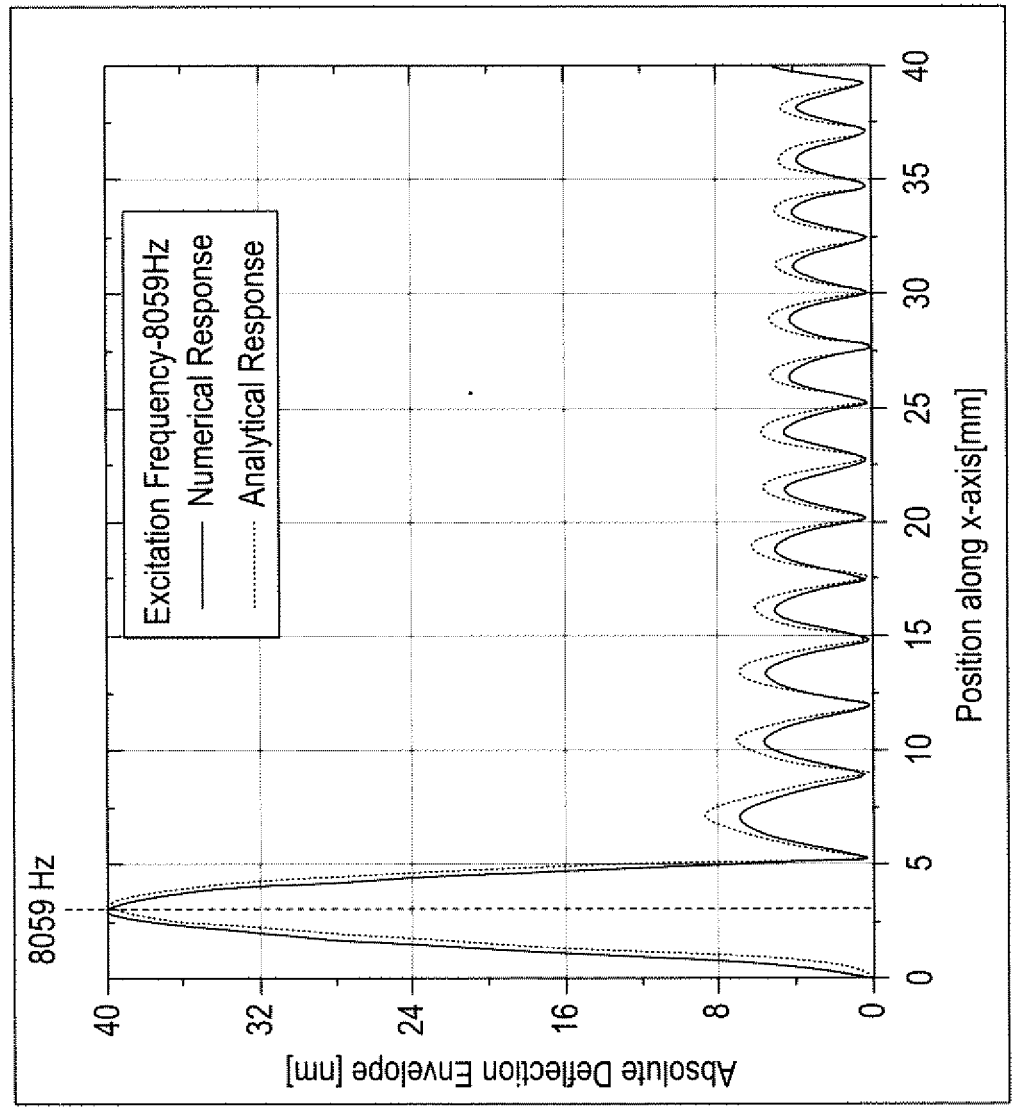
(c)
FIG. 7 (con't)

TABLE I

MODEL PARAMETERS AND NOTATIONS

| Symbol | Quantity |
|---|---|
| L | Basilar Membrane Length |
| $B_i$ | Base Width |
| $B_f$ | Apex Width |
| K | Bending Stiffness of the Membrane |
| P | Harmonic Pressure |
| E | Modulus of Elasticity |
| $\rho$ | Density |
| $\xi$ | Dynamic Deflection |
| h | Thickness of Membrane |
| v | Poisson Ratio |
| $\omega$ | Excitation Frequency |
| u | u-axis component |
| v | v-axis component |

FIG. 11

TABLE II

MATERIAL PROPERTIES OF THE MODEL AND NOTATIONS

| Parameters | Value | Unit |
|---|---|---|
| Stiffness (E) | 4.1 | GPa |
| Density ($\rho$) | 1780 | Kg/m$^3$ |
| Poisson Ratio ($\nu$) | 0.18 | |
| Length (L) | 40 | mm |
| Base width ($B_i$) | 3 | mm |
| Apex Width ($B_f$) | 5 | mm |
| Thickness (h) | 45 | µm |

FIG. 12

ARTIFICIAL COCHLEA FOR MECHANICAL PROCESSING OF SOUND

TECHNICAL FIELD

The subject matter disclosed herein is generally directed to bio-inspired acoustic bandpass sensors with a user-defined range of frequencies mimicking the geometric structure of a human's basilar membrane to capture infrasonic, sonic or ultrasonic waves per design with a target frequency range for a specific application and methods of making same.

BACKGROUND

COCHLEA implants and hearing aids substantially improve quality of life and well-being of individuals with hearing impairments. Currently, more than 10% of the general population and 35% of people over 65 find it difficult to work and perform activities of daily living (ADL) without some sort of a hearing aid. See, H. J. Hoffman, R. A. Dobie, K. G. Losonczy, C. L. Themann, and G. A. Flamme, "Declining prevalence of hearing loss in US adults aged 20 to 69 years," *JAMA otolaryngol.-Head Neck Surg.*, vol. 143, no. 3, pp. 274-285, 2017 and F. R. Lin, J. K. Niparko, and L. Ferrucci, "Hearing loss prevalence in the United States," *Arch. Internal Med.*, vol. 171, no. 20, pp. 1851-1853, 2011. Hearing impairment, if untreated, negatively influences one's quality of life and their respective income immensely. On the other hand, artificial cochlea can enhance the feasibility of better human-robot interaction, if new generation robots are equipped with artificial hearing device mimicking human cochlea. We envision that future robots for rescue operation will get benefited by the artificial hearing device.

So far in our society, the artificial processing of sound is achieved through microphones and digital electronics system, which are not always reliable. However, our nature does it differently. It uses a mechanical device to process the sound in various ranges of frequencies entitled to different animals depending on their evolutionary history. A cochlea inside our inner ear is responsible for our hearing and by nature's choice it is a mechanical device.

Accordingly, it is an object of the present disclosure to provide an artificial means to mimic the functionality of the human cochlea to enhance the capability of processing sound mechanically for various sonic and ultrasonic sensor applications and create artificial ears for future humanoid robots.

Citation or identification of any document in this application is not an admission that such a document is available as prior art to the present disclosure.

SUMMARY

The above objectives are accomplished according to the present disclosure by providing in one instance a bioinspired acoustic bandpass sensor. The sensor may include at least one sensor array defining a geometric structure formed to mimic a basilar membrane of a subject, the geometric structure may include at least one electrode fabricated on opposite surfaces of a piezoelectric continuum and the piezoelectric continuum having a trapezoidal geometry atop an elastomer matrix that has at least one embedded electrode groove to contain the at least one electrode and a duct. Further, the subject may be a human. Still, the bioinspired acoustic bandpass sensor may capture infrasonic, sonic, and ultrasonic waves. Yet again, the bioinspired acoustic bandpass sensor may captures only at least one user selected frequency. Moreover, the bandpass sensor may be a plate type model or a beam type model. Again still, the geometric structure may enable the bioinspired acoustic bandpass sensor to function as a linear transmission line with a traveling-wave behavior. Still further, the piezoelectric continuum may define a graded stiffness along a longitudinal structure of the piezoelectric continuum via the trapezoidal geometry forming a tapered geometry that varies at least one mechanical boundary condition. Still yet further, vibration energy at a given frequency may be distributed across the geometric structure but induces peak deflection amplitude at a single location. Even further, the spatial shift of peak deflection may be due to a bending stiffness of the geometric structure differing between an apex end and a base end caused by gradual variation of a width of the geometric structure along an X-axis. Even still, the bioinspired acoustic bandpass sensor may have a coiled shape.

In a further instance, a method of making a bioinspired acoustic bandpass sensors is provided. The method may include forming at least one sensor array defining a geometric structure to mimic a basilar membrane of a subject, forming the geometric structure to include at least one electrode fabricated on opposite surfaces of a piezoelectric continuum, and forming the piezoelectric continuum to define a trapezoidal geometry atop an elastomer matrix having at least one embedded electrode groove to contain the at least one electrode and a duct. Further, the method may include mimicking the basilar membrane of a human. Still yet, the bioinspired acoustic bandpass sensor may be formed to capture infrasonic, sonic, and ultrasonic waves. Again, the bioinspired acoustic bandpass sensor may be formed to capture only at least one user selected frequency. Still again, the bioinspired acoustic bandpass sensor may have a plate type or a beam type configuration. Further yet, the geometric structure may function as a linear transmission line with a traveling-wave behavior. Even further, the piezoelectric continuum may have a graded stiffness along a longitudinal structure of the piezoelectric continuum via the trapezoidal geometry forming a tapered geometry that varies at least one mechanical boundary condition. Still again further, the geometric structure may be formed so that vibration energy at a given frequency is distributed across the geometric structure but induces peak deflection amplitude at a single location. Still yet, the geometric structure may be shaped so that spatial shift of peak deflection is due to a bending stiffness of the geometric structure differing between an apex end and a base end caused by gradual variation of a width of the geometric structure along an X-axis. Further again, the bioinspired acoustic bandpass filter may be formed into a coiled shape.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 11 shows Table 1, Model Parameters and Notations.

FIG. 12 shows Table 2, Material Properties of the Model and Notations.

Figure 1:
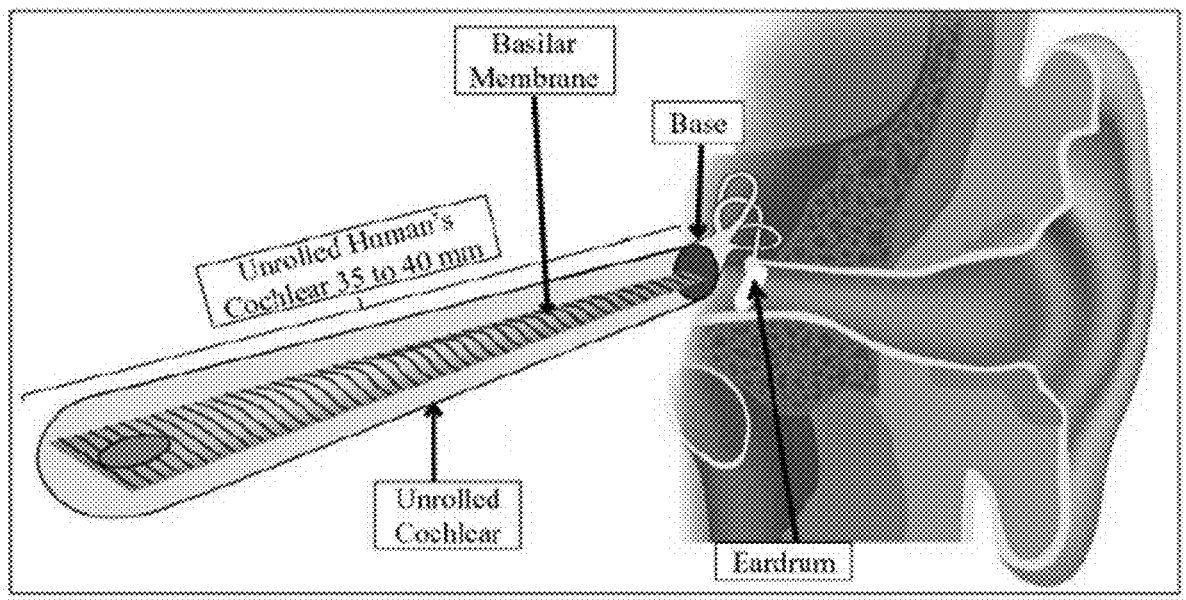
FIG. 1 shows an unrolled human cochlear, simplified to emphasize trapezoidal shape of the basilar membrane.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Concurrent to the development of electronic processing of frequencies, mechanical sensors capable of selecting, processing, filtering specific single or a distinct band of frequencies are contributing an essential role in many sciences, technologies and industrial applications. This disclosure presents a bio-inspired acoustic bandpass sensor with a user-defined range of frequencies. In the proposed sensor, the geometric structure of a human's basilar membrane is mimicked as the main model to capture infrasonic, sonic or ultrasonic waves per design with a target frequency range for a specific application. In the future it is possible to use such device as artificial cochlea for selective human hearing, help autistic children to hear only specific range of frequencies, and implant the artificial cochlea to humanoid robots for more effective and efficient human-robot interaction like in society.

Human's basilar membrane in the inner ear could be investigated in two ways, a) plate type and b) beam type. Both models are numerically and experimentally validated. In the first step, a predictive mathematical model of the proposed bandpass sensor is developed based on a plate type model. Next, the dynamic behavior of beamtype basilar membrane with 100 Zinc-Oxide electrodes is modeled and numerically verified. A sensor array may be fabricated with using photolithography techniques with Polyvinylidene Difluoride (PVDF) piezoelectric material as a proof-of-concept. The fabricated plate-type sensor is experimentally tested, and its effective performance is validated in the frequency range of ~3 kHz-8 kHz. Similarly, in beam model the longest electrode is near the Apex region (8 mm×300 μm×20 μm thick) and the shortest electrode is near the Base side of the sensor with (3 mm×300 μm×110 μm thick) are proposed. Eventually, the effective performances of the proposed acoustic sensors are verified using COMSOL Multiphysics Software and the functionality of the proposed sensor appeared in the frequency range of ~0.5 kHz near Apex and to ~20 kHz near base side.

This disclosure could be used for: (a) mimicking the physics of human cochlea in human inner ear; (b) mechanical processing of sound reliably; (c) create opportunity to develop artificial mechanical ear for hearing impaired; (d) create opportunity to develop artificial ear for humanoid robots such that they can listen and interact like humans do; (e) create opportunity to create broad band sonic and ultrasonic sensors with selective range of frequencies; (f) create opportunity for selective hearing, beneficial for autistic kids those who hear more frequencies, beyond the normal human range of sonic frequencies; (g) sensors with selective band gaps; and (h) acoustic switches, transistors, energy convertor, energy harvesting.

This disclosure provides creating selective sonic and ultrasonic sensors with specific band gaps and many more acoustics related applications. Inspired from human cochlea, we propose an artificial basilar membrane structure based on an array of gold electrodes microfabricated along the opposite surfaces of a piezoelectric continuum. The proposed piezoelectric continuum features an isosceles trapezoidal geometry and is situated atop an elastomer matrix with embedded electrode grooves and a duct. At first, a detailed analytical model is presented, which formulates the continuum's planar deflection equation, governing its elastodynamic behavior. Subsequently, in order to verify the analytical outcomes, a multiphysics finite-element analysis is performed in COMSOL®. Both analytical and numerical models demonstrate desired frequency selectivity akin to the capability of a biological basilar membrane. Subsequently, a proof-of-concept model of the proposed structure is custom-fabricated through standard photo- and soft lithography techniques using Polyvinylidene Difluoride (PVDF), gold, and Polydimethylsiloxane (PDMS) materials. Finally, the fabricated artificial basilar membrane that is intended to be used as a broad band sensor, and artificial cochlea for seamless human-robot interaction is experimentally characterized using a custom-built acoustic exciter, and its effective performance is validated within the frequency range of 3 kHz to 8 kHz.

The human ear picks up sound waves traveling inside the auditory canal and converts them into valuable information interpretable by the brain. Sound waves first enter the ear and are directed through the ear canal to reach the ear drum. As the ear drum begins to vibrate, it sets the ossicular chain in an oscillating motion, which is received by the inner ear. Within the inner ear, the cochlea receives the mechanical vibrations and converts them into electrical signals, which are then passed onto the brain. Within the cochlea, there is a flexible membrane called basilar membrane (BM), which separates the two liquid-filled tubes running inside the cochlear coil. When the spiral shaped cochlea is unrolled, the BM can be visualized as a trapezoidal geometry. The narrow and stiff (i.e., less flexible) side of the BM is located near the basal end (close to the oval window), while the wide and more flexible side is close to the apical end as shown in FIG. 1, which shows an unrolled human cochlear, simplified to emphasize the trapezoidal shape of the basilar membrane. Hence, by virtue of physical parameters and material properties, the BM features its higher Eigenfrequencies near the basal end, whereas the lower Eigenfrequencies reside in the vicinity of the apical end. See, M. Saadatzi, M. N. Saadatzi, V. Tavaf, and S. Banerjee, "Finite element analysis of smart structural implications of a beamtype artificial basilar membrane inspired sensor," *Proc. SPIE*, vol. 10965, March 2019, Art. no. 109650S and M. Saadatzi, M. N. Saadatzi, V. Tavaf, and S. Banerjee, "Development of a PVDF based artificial basilar membrane," *Proc. SPIE*, vol. 10593, March 2018, Art. No. 1059318. Upon receiving an acoustic signal with a given frequency, the fluid in the cochlea is set in motion, causing a vibration along the BM. However, along the length of the BM at a particular location, this vibration is localized due to local resonance and it causes a much higher amplitude of deflection of the BM. This means that different frequencies have different, yet defined, spatial locations along the BM to respond. The local vibration causes tension differences in the ear sensory cells (i.e., hair cells) which produce bioelectrical signals. Those signals are then passed along the auditory nerves to the brain. This unique natural structure, with gradually varying stiffness, furnishes a frequency separation mechanism of acoustic input signals when the local resonance dominates at local vibration of the BM at different locations for different frequency input. See, Makati Medical Center. (Aug. 13, 2019). Everything About Noise Induced Hearing Loss. [Online]. Available: https://www.makatimed-.net.ph/news-and-exhibits/news/are-you-going-deaf.

In other words, each acoustic signal frequency is tuned to the Eigenfrequency of a certain location of the BM and generates a large biosignal that is spatially filtered. Therefore, using the geometry and material properties of BM, the brain perceives audible signals which are decomposed into many narrow sub-bands of gradually-shifting frequencies.

An artificial cochlea is an implantable neural prosthesis that can restore hearing perception in individuals with severe damage in their inner ear (particularly, hair cells) by directly transmitting sound stimuli to the auditory nerves via their electrical stimulation. See, D. Hajioff, "Cochlear implantation: A review of current clinical practice," *Brit. J. Hospital Med.*, vol. 77, no. 12, pp. 680-684, 2016. Artificial *cochleae* include artificial basilar membranes (ABM) that are typically made of arrays of microcantilevers, fabricated via application of MEMS technology on high Young's modulus materials. See, M. Harada, N. Ikeuchi, S. Fukui, H. Toshiyoshi, H. Fujita, and S. Ando, "Micro mechanical acoustic sensor toward artificial basilar membrane modeling," *IEEJ Trans. Sensors Micromach.*, vol. 119, No. 3, pp. 125-130, 1999 and S.-H. Shen, S.-T. Young, and W. Fang, "Design and fabrication of a MEMS filter bank for hearing aids applications," in *Proc. 2nd Annu. Int. IEEE-EMBS Special Topic Conf. Microtechnol. Med. Biol.*, May 2002, pp. 352-355. These microcantilever arrays are comb-shaped digitated structures with an ensemble of "fingers" with gradually-varied length, arranged at uniform intervals and hanging from a rigid support. Due to their varied length, each of these fingers has unique Eigenfrequency (i.e., resonance) and, hence, is tuned to a particular audible tone. These fingers have a common support, but are otherwise mechanically isolated, with air- or fluid-filled gaps. For instance, Tanaka and colleagues, see K. Tanaka, M. Abe, and S. Ando, "A novel mechanical cochlea 'fishbone' with dual sensor/actuator characteristics," *IEEE/ASME Trans. Mechatronics*, vol. 3, no. 2, pp. 98-105, June 1998, developed an ABM via a resonator array of thin silicon digitated fingers fashioned as a fishbone structure. In their proposed structure, the spatial frequency selection was realized by gradual variation of the fingers' length along the resonator array. Xu and colleagues, see T. Xu, M. Bachman, F.-G. Zeng, and G.-P. Li, "Polymeric microcantilever array for auditory front-end processing," *Sens. Actuators A, Phys.*, Vol. 114, Nos. 2-3, pp. 176-182, September 200, proposed an auditory front-end processing unit that realized the spatial frequency selectivity of a BM using a polymeric microcantilever resonance array. Their proposed structure employed an array of transparent microcantilevers with variable stiffness, which functioned as optical waveguides to direct a light beam emitted from an LED to a photo diode. Battiston and colleagues, see F. M. Battiston et al., "A chemical sensor based on a microfabricated cantilever array with simultaneous resonance-frequency and bending readout," *Sens. Actuators B, Chem.*, Vol. 77, Nos. 1-2, pp. 122-131, June 2001, microfabricated a BM-inspired chemical sensor using a resonator array of eight thin silicon microcantilever beams. The operating principle of their chemical sensor relied on transduction of chemical processes into a mechanical response (i.e., bending and vibration). They glazed one side of each microcantilever with a chemo-marker that caused differential surface stress and hence produced a mechanical response when exposed to analyte molecules. In an experimental context, optical detection of cantilever-deflection by means of an array of surface emitting lasers was utilized to detect individual cantilever responses. Similarly, Moulin and colleagues, see A. M. Moulin, S. J. O'Shea, and M. E. Welland, "Microcantilever-based biosensors," *Ultramicroscopy*, Vol. 82, No. 1-4, pp. 23-31, February 2000, microfabricated a class of bio-chemical sensors using microcantilever arrays. Chen and colleagues, see F. Chen et al., "A hydromechanical biomimetic cochlea: Experiments and models," *J. Acoust. Soc. Amer.*, vol. 119, no. 1, pp. 394-405, January 2006, proposed an artificial basilar membrane by depositing discrete copper beams on a piezoelectric substrate. Shintaku and colleagues, see H. Shintaku, T. Kobayashi, K. Zusho, H. Kotera, and S. Kawano, "Wide range frequency selectivity in an acoustic sensor fabricated using a microbeam array with non-uniform thickness," *J. Micromech. Microeng.*, Vol. 23, No. 11, November 2013, Art. No. 115014, proposed a microbeam array with variable thickness and investigated its suitability for an acoustic sensor with a wide range of frequency selectivity and presented a mathematical model. A similar design was presented by Jang and colleagues, see J. Jang et al., "A microelectromechanical system artificial basilar membrane based on a piezoelectric cantilever array and its characterization using an animal model," *Sci. Rep.*, Vol. 5, No. 1, p. 12447, December 2015, using a piezoelectric cantilever array to model an artificial basilar membrane. White and Grosh, see R. D. White and K. Grosh, "Microengineered hydromechanical cochlear model," *Proc. Nat. Acad. Sci. USA*, Vol. 102, No. 5, pp. 1296-1301, February 2005, constructed a micro-engineered hydromechanical cochlea that had a micromachined membrane as well as a fluid-filled duct to mimic the cochlear chamber. Kim and colleagues, see J. Jang, S. Kim, D. J. Sly, S. J. O'leary, and H. Choi, "MEMS piezoelectric artificial basilar membrane with passive frequency selectivity for short pulse width signal modulation," Sens. *Actuators A, Phys.*, vol. 203, pp. 6-10, December 2013 and S. Kim, W. J. Song, J. Jang, J. H. Jang, and H. Choi, "Mechanical frequency selectivity of an artificial basilar membrane using a beam array with narrow supports," *J. Micromech. Microeng.*, vol. 23, no. 9, September 2013, Art. no. 095018, assessed the frequency selectivity of an artificial basilar membrane constructed using a piezoelectric beam array. Finally, imitating a BM structure, Shahruz, S. M. Shahruz, "Design of mechanical band-pass filters with large frequency bands for energy scavenging," *Mechatronics*, vol. 16, no. 9, pp. 523-531, November 2006. and S. M. Shahruz, "Limits of performance of mechanical band-pass filters used in energy scavenging," *J. Sound Vibrat.*, vol. 293, nos. 1-2, pp. 449-461, May 2006, developed an energy harvester to scavenge energy from ambient vibrations with a wide range of oscillation frequencies. The harvesters were based on an array of varied-length piezoelectric microcantilevers with a small mass at their tip.

Although microcantilever-based ABMs with such a disjoint comb-shaped structure are popular and can realize frequency separation, an acceptable frequency selectivity and decomposition in the entire audible frequency range necessitates a large number of microcantilevers to be arranged in a constrained space (i.e., 35-40 mm human cochlea size). This considerably complicates the fabrication process, but also brings about a rather fragile array structure with insufficient mechanical strength and, hence, less-than-ideal lifetime (typically less than 20 years), requiring explanation and re-implantation in many recipients of cochlea implants. Furthermore, the discrete nature of this comb-like structure tends to overlook the frequencies in between two adjacent microcantilevers tuned for specific tones. Microcantilever-based ABMs neglect the longitudinal coupling and continuous nature of the biological BM.

To address the drawbacks, the current disclosure provides an ABM structure with a piezoelectric continuum, inspired by the tapered geometry of the human BM. With a special design of electrodes and integration with the piezoelectric continuum-like BM, we propose to mimic the functionality of the sensory cells in human cochlea. The continuous geometry of the proposed structure enables the proposed ABM to function as a linear transmission line with a traveling-wave behavior, as opposed to a disjoint array of discrete microcantilevers. This ABM continuum, which is made from a piezoelectric material, vibrates due to acoustic excitations and generates electric potential. The proposed ABM furnishes a graded stiffness along its longitudinal structure via a tapered geometry that varies the mechanical boundary conditions, whereas the mechanical properties are continuously homogenous. Such graded stiffness of this piezoelectric continuum along with the special electrode distribution enhances the spatial selectivity of the acoustic frequencies. Acoustic waves along a wide range of frequencies across the ABM structure are processed owing to the physics of local resonance. The resonating spot of the piezoelectric continuum vibrates relatively with a large magnitude. Hence, the generated voltage corresponding to that location is much larger than the neighboring locations. This realizes a spatial separation and mapping of acoustic frequencies.

Herein, we first develop an analytical model for the proposed ABM continuum with the tapered geometry, including a variety of physical parameters and boundary conditions that contribute to the frequency selectivity of the proposed structure and local resonance phenomenon. This analytical model affords predictive analysis and fine-tuning of the desired frequency ranges and, hence, optimal design of the ABM structure. Subsequently, the ABM structure with the desired geometry and properties, obtained through predictive modeling, is then designed using computer aided design (CAD) software and further evaluated via a finite-element analysis software (COMSOL Multiphysics®). The results from COMSOL confirms the analytical outcomes. Pursuant to this, a proof-of-concept model of the proposed ABM is microfabricated through standard photo- and soft lithography techniques. Finally, the developed ABM is experimentally characterized via a customized experimental testbed. See M. Saadatzi, M. N. Saadatzi, V. Tavaf, and S. Banerjee, "AEVE 3D: Acousto electrodynamic three-dimensional vibration exciter for engineering testing," *IEEE/ASME Trans. Mechatronics*, vol. 23, no. 4, pp. 1897-1906, August 2018. The experimental results closely agree with both the analytical and numerical models and confirm the effectiveness of the proposed frequency selectivity technique utilized in the ABM structure.

Figure 2:
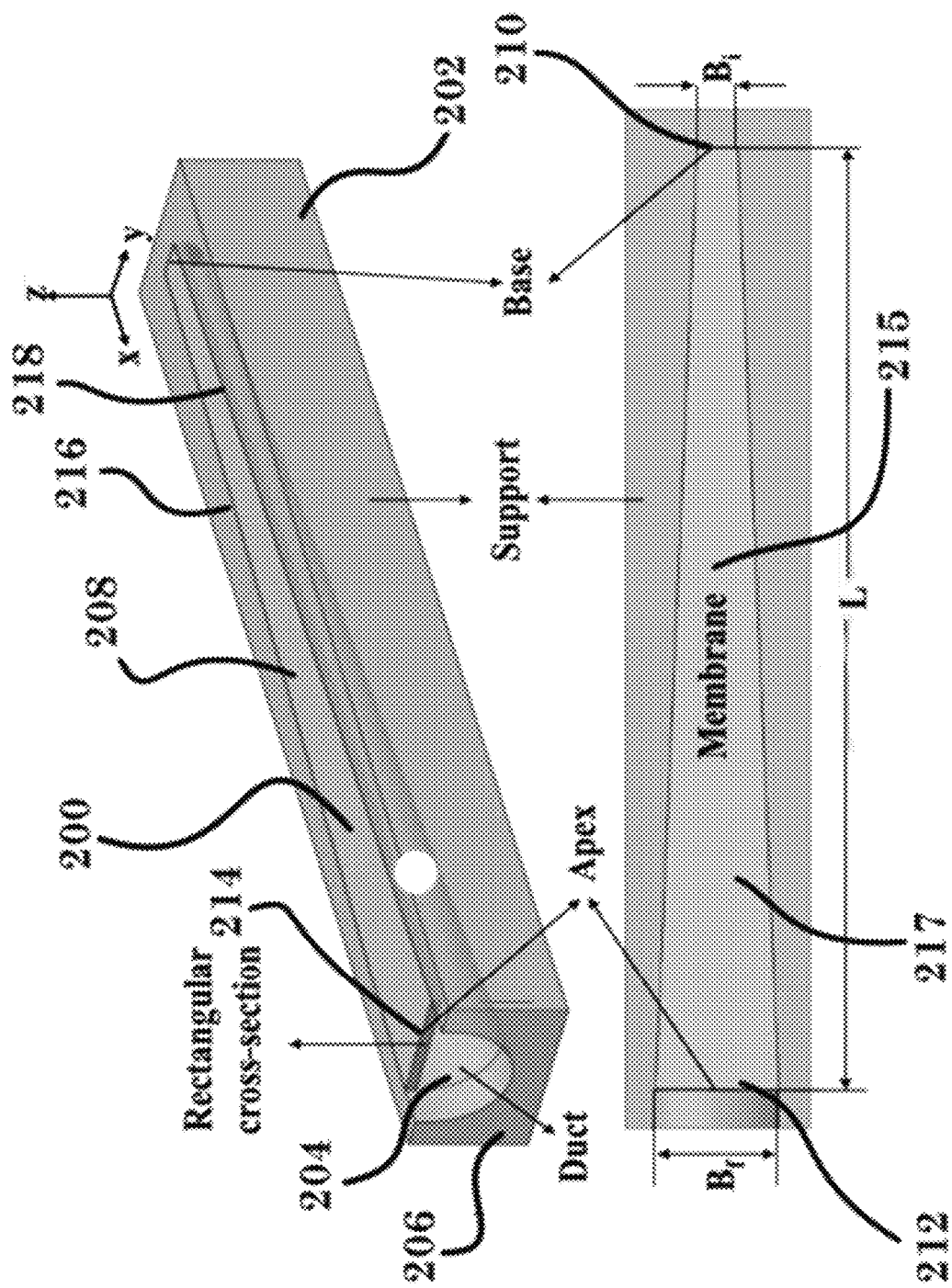
FIG. 2 shows a the geometric configuration of a proposed artificial basilar membrane of the current disclosure.

The current disclosure describes the proposed ABM structure and illuminates on the analytical and numerical analysis, outlines the microfabrication process, the experimental testbed, and the data acquisition system as well as provides experimental testing and results Elastodynamic Modeling FIG. 2 illustrates the ABM structure, which includes a thin continuum BM 200 and bottom support 202. BM 200 may have a planar structure and features an trapezoidal geometry 208, which may be isosceles in shape, where the narrow and wide parallel sides represent the cochlear base 210 and apex 212, respectively. This continuum BM 200 is situated over an air-filled duct 204 embedded in bottom support 202 and is fixated at every side except the apical end 206. The model parameters are defined in Table I, see FIG. 11.

$$K(x, y) = \frac{Eh^3}{12(1-v^2)} \quad (1)$$

$$K\frac{\partial^4 w}{\partial x^4} + 2K\frac{\partial^4 w}{\partial x^2 \partial y^2} + K\frac{\partial^4 w}{\partial y^4} + 2\frac{\partial K}{\partial x}\frac{\partial^3 w}{\partial x^3} + 2\frac{\partial K}{\partial x}\frac{\partial^3 w}{\partial x^3} + \quad (2)$$

$$2\frac{\partial K}{\partial y}\frac{\partial^3 w}{\partial y^3} + \frac{\partial^2 K}{\partial x^2}\frac{\partial^2 w}{\partial x^2} + \frac{\partial^2 K}{\partial y^2}\frac{\partial^2 w}{\partial y^2} + v\frac{\partial^2 K}{\partial x^2}\frac{\partial^2 w}{\partial y^2} + v\frac{\partial^2 K}{\partial y^2}\frac{\partial^2 w}{\partial x^2} +$$

$$K\frac{\partial^2 v}{\partial x^2}\frac{\partial^2 w}{\partial y^2} + K\frac{\partial^2 v}{\partial y^2}\frac{\partial^2 w}{\partial x^2} + 2\frac{\partial K}{\partial x}\frac{\partial^3 w}{\partial x \partial y} + 2\frac{\partial K}{\partial y}\frac{\partial^3 w}{\partial x^2 \partial y} +$$

$$2\frac{\partial K}{\partial x}\frac{\partial v}{\partial x}\frac{\partial^2 w}{\partial y^2} + 2\frac{\partial K}{\partial y}\frac{\partial v}{\partial y}\frac{\partial^2 w}{\partial x^2} - 2\frac{\partial K}{\partial x}\frac{\partial v}{\partial x}\frac{\partial^2 w}{\partial x \partial y} - 2\frac{\partial K}{\partial y}\frac{\partial v}{\partial y}\frac{\partial^2 w}{\partial x \partial y} +$$

$$2(1-v)\frac{\partial^2 K}{\partial x \partial y}\frac{\partial^2 w}{\partial x \partial y} - 2K\frac{\partial^2 v}{\partial x \partial y}\frac{\partial^2 w}{\partial x \partial y} + P = -m\frac{\partial^2 w}{\partial t^2}$$

Substituting harmonic vertical deflection and pressure as $w=\xi e^{i\omega t}$; $P=pe^{i\omega t}$ $$K\frac{\partial^4 \xi}{\partial x^4} + 2K\frac{\partial^4 \xi}{\partial x^2 \partial y^2} + K\frac{\partial^4 \xi}{\partial y^4} + 2\frac{\partial K}{\partial x}\frac{\partial^3 \xi}{\partial x^3} + 2\frac{\partial K}{\partial y}\frac{\partial^3 \xi}{\partial y^3} + \quad (3)$$

$$\frac{\partial^2 K}{\partial x^2}\frac{\partial^2 \xi}{\partial x^2} + \frac{\partial^2 K}{\partial y^2}\frac{\partial^2 \xi}{\partial y^2} + v\frac{\partial^2 K}{\partial x^2}\frac{\partial^2 \xi}{\partial y^2} + v\frac{\partial^2 K}{\partial y^2}\frac{\partial^2 \xi}{\partial x^2} + K\frac{\partial^2 v}{\partial x^2}\frac{\partial^2 \xi}{\partial y^2} +$$

$$K\frac{\partial^2 v}{\partial y^2}\frac{\partial^2 \xi}{\partial x^2} + 2\frac{\partial K}{\partial x}\frac{\partial^3 \xi}{\partial x \partial y} + 2\frac{\partial K}{\partial y}\frac{\partial^3 \xi}{\partial x^2 \partial y} + 2\frac{\partial K}{\partial x}\frac{\partial v}{\partial x}\frac{\partial^2 \xi}{\partial y^2} +$$

$$2\frac{\partial K}{\partial y}\frac{\partial v}{\partial y}\frac{\partial^2 \xi}{\partial x^2} - 2\frac{\partial K}{\partial x}\frac{\partial v}{\partial x}\frac{\partial^2 \xi}{\partial x \partial y} - 2\frac{\partial K}{\partial y}\frac{\partial v}{\partial y}\frac{\partial^2 \xi}{\partial x \partial y} +$$

$$2\frac{\partial^2 K}{\partial x \partial y}\frac{\partial^2 \xi}{\partial x \partial y} - 2v\frac{\partial^2 K}{\partial x \partial y}\frac{\partial^2 \xi}{\partial x \partial y} - 2K\frac{\partial^2 v}{\partial x \partial y}\frac{\partial^2 \xi}{\partial x \partial y} - \rho h\omega^2 \xi = -p$$

$$K\left[\frac{1}{\cos^4\theta}\frac{\partial^4 \xi}{\partial u^4} - \frac{4\sin\theta}{\cos^4\theta}\frac{\partial^4 \xi}{\partial u^3 \partial v} + \right. \quad (4)$$

$$\left. \frac{6\sin^2\theta}{\cos^4\theta}\frac{\partial^4 \xi}{\partial u^2 \partial v^2} - \frac{4\sin^3\theta}{\cos^4\theta}\frac{\partial^4 \xi}{\partial u \partial v^3} + \frac{\sin^4\theta}{\cos^4\theta}\frac{\partial^4 \xi}{\partial v^4}\right] +$$

$$2K\left[\frac{1}{\cos^2\theta}\frac{\partial^4 \xi}{\partial u^2 \partial v^2} - \frac{2\sin\theta}{\cos^2\theta}\frac{\partial^4 \xi}{\partial u \partial v^3} + \frac{\sin^2\theta}{\cos^2\theta}\frac{\partial^4 \xi}{\partial v^4}\right] + K\left[\frac{\partial^4 \xi}{\partial v^4}\right] +$$

$$2\frac{\partial K}{\partial x}\left[\frac{1}{\cos^3\theta}\frac{\partial^3 \xi}{\partial u^2 \partial v} - \frac{2\sin\theta}{\cos^2\theta}\frac{\partial^3 \xi}{\partial u \partial v^2} + \frac{3\sin^2\theta}{\cos^3\theta}\frac{\partial^3 \xi}{\partial u \partial v^2} - \frac{\sin^3\theta}{\cos^3\theta}\frac{\partial^3 \xi}{\partial v^3}\right] +$$

$$2\left[\frac{\partial K}{\partial y}\frac{\partial^3 \xi}{\partial v^3}\right] + \frac{\partial^2 K}{\partial x^2}\left[\frac{1}{\cos^2\theta}\frac{\partial^2 \xi}{\partial u^2} - \frac{2\sin\theta}{\cos^2\theta}\frac{\partial^2 \xi}{\partial u \partial v} + \frac{\sin^2\theta}{\cos^2\theta}\frac{\partial^2 \xi}{\partial v^2}\right] +$$

-continued $$\frac{\partial^2 K}{\partial y^2}\left[\frac{\partial^2 \xi}{\partial v^2}\right] + v\frac{\partial^2 K}{\partial x^2}\left[\frac{\partial^2 \xi}{\partial v^2}\right] +$$

$$v\frac{\partial^2 K}{\partial y^2}\left[\frac{1}{\cos^2\theta}\frac{\partial^2 \xi}{\partial u^2} - \frac{2\sin\theta}{\cos^2\theta}\frac{\partial^2 \xi}{\partial u \partial v} + \frac{\sin^2\theta}{\cos^2\theta}\frac{\partial^2 \xi}{\partial v^2}\right] + K\frac{\partial^2 v}{\partial x^2}\left[\frac{\partial^2 \xi}{\partial v^2}\right] +$$

$$K\frac{\partial^2 v}{\partial y^2}\left[\frac{1}{\cos^2\theta}\frac{\partial^2 \xi}{\partial u^2} - \frac{2\sin\theta}{\cos^2\theta}\frac{\partial^2 \xi}{\partial u \partial v} + \frac{\sin^2\theta}{\cos^2\theta}\frac{\partial^2 \xi}{\partial v^2}\right] +$$

$$2\frac{\partial K}{\partial x}\left[\frac{1}{\cos\theta}\frac{\partial^3 \xi}{\partial u \partial v^2} - \frac{\sin\theta}{\cos\theta}\frac{\partial^3 \xi}{\partial v^3}\right] +$$

$$2\frac{\partial K}{\partial y}\left[\frac{1}{\cos^2\theta}\frac{\partial^3 \xi}{\partial u^2 \partial v} - \frac{2\sin\theta}{\cos^2\theta}\frac{\partial^3 \xi}{\partial u \partial v^2} - \frac{\sin^2\theta}{\cos^2\theta}\frac{\partial^3 \xi}{\partial v^3}\right] + 2\frac{\partial K}{\partial x}\frac{\partial v}{\partial x}\left[\frac{\partial^2 \xi}{\partial v^2}\right] +$$

$$2\frac{\partial K}{\partial y}\frac{\partial v}{\partial y}\left[\frac{1}{\cos^2\theta}\frac{\partial^2 \xi}{\partial u^2} - \frac{2\sin\theta}{\cos^2\theta}\frac{\partial^2 \xi}{\partial u \partial v} + \frac{\sin^2\theta}{\cos^2\theta}\frac{\partial^2 \xi}{\partial v^2}\right] - 2\frac{\partial K}{\partial y}$$

$$\frac{\partial v}{\partial x}\left[\frac{1}{\cos\theta}\frac{\partial^2 \xi}{\partial u \partial v} - \frac{\sin\theta}{\cos\theta}\frac{\partial^2 \xi}{\partial v^2}\right] - 2\frac{\partial K}{\partial x}\frac{\partial v}{\partial y}\left[\frac{1}{\cos\theta}\frac{\partial^2 \xi}{\partial u \partial v} - \frac{\sin\theta}{\cos\theta}\frac{\partial^2 \xi}{\partial v^2}\right] + 2$$

$$\frac{\partial^2 K}{\partial x \partial y}\left[\frac{1}{\cos\theta}\frac{\partial^2 \xi}{\partial u \partial v} - \frac{\sin\theta}{\cos\theta}\frac{\partial^2 \xi}{\partial v^2}\right] - 2v\frac{\partial^2 K}{\partial x \partial y}\left[\frac{1}{\cos\theta}\frac{\partial^2 \xi}{\partial u \partial v} - \frac{\sin\theta}{\cos\theta}\frac{\partial^2 \xi}{\partial v^2}\right] -$$

$$2K\frac{\partial^2 v}{\partial x \partial y}\left[\frac{1}{\cos\theta}\frac{\partial^2 \xi}{\partial u \partial v} - \frac{\sin\theta}{\cos\theta}\frac{\partial^2 \xi}{\partial v^2}\right] - \rho h\omega^2 \xi = -p$$

Analytical Modeling

Considering the ABM geometry and boundary conditions, the model parameters that can be controlled are the continuum's Poisson ratio, Young's modulus, density, thickness, and length of each side. The derivation procedure for elastodynamic equations of the proposed ABM continuum governing its vibration behavior at a given (x,y) coordinate is shown in Eqn. (1), which formulates the bending stiffness, K, of a rectangular plate based on its modulus elasticity, E, thickness, h, and Poisson ratio, v. See, E. Ghafoori, M. H. Kargarnovin, and A. R. Ghahremani, "Dynamic responses of a rectangular plate under motion of an oscillator using a semi-analytical method," *J. Vibrat. Control*, vol. 17, no. 9, pp. 1310-1324, August 2011. Mauritsson and colleagues, see K. Mauritsson, P. D. Folkow, and A. Bostrom, "Dynamic equations for a fully anisotropic elastic plate," *J. Sound Vibrat.*, vol. 330, no. 11, pp. 2640-2654, May 2011 and K. Mauritsson and P. D. Folkow, "Dynamic equations for a fully anisotropic piezoelectric rectangular plate," *Comput. Struct.*, vol. 153, pp. 112-125, June 2015, derived a series of dynamic plate equations based on the three-dimensional piezoelectric theory for a fully anisotropic piezoelectric rectangular plate. Ahmed and Banerjee proposed a fully functional equation, see R. Ahmed and S. Banerjee, "An articulated predictive model for fluid-free artificial basilar membrane as broadband frequency sensor," *Mech. Syst. Signal Process.*, vol. 100, pp. 766-781, February 2018, for a plate of any shape written in Eq. (2). In this equation, ω denotes the excitation frequency, ω=ξ$e^{i\omega t}$ is the harmonic deflection of the plate, and P=p$e^{i\omega t}$ represents the harmonic pressure excitation on the plate. If the dynamic deflection amplitude, g, is assumed to be a function of Cartesian coordinate system with x and y axes, one can easily transform eqn. (2) to eqn. (3) in frequency domain substituting w=ξ$e^{i\omega t}$ and P=p$e^{i\omega t}$.

Since the ABM geometry proposed in this disclosure features a trapezoidal geometry, eqn. (3) cannot be directly employed, and a coordinate transformation is needed. If we define the new coordinate system, u-v, such that v is along the y-axis, and u has an angle with the x-axis, the x and y components can be expressed as x=u cos θ and y=u sin θ+v, where θ is the acute base angle. Using the new coordinate system, the dynamic deflection equation of our trapezoidal continuum, with the aforementioned boundary conditions, can be represented as in eqn. (4).

Eqn. (4) can be solved using the elastodynamic finite (central) difference discretization method proposed by several researchers. See R. Ahmed and S. Banerjee, "An articulated predictive model for fluid-free artificial basilar membrane as broadband frequency sensor," *Mech. Syst. Signal Process.*, vol. 100, pp. 766-781, February 2018, L. Dovgilovich and I. Sofronov, "High-accuracy finite-difference schemes for solving elastodynamic problems in curvilinear coordinates within multiblock approach," *Appl. Numer. Math.*, vol. 93, pp. 176-194, July 2015, R. U. Ahmed and S. Banerjee, "A predictive model for biomimetic plate type broadband frequency sensor," *Proc. SPIE*, April 2016, vol. 9797, Art. no. 97970T, and R. U. Ahmed, "Bio-inspired design of mechanical band pass sensor with the ability to scavenge energy," Ph.D. dissertation, Univ. South Carolina, Columbia, SC, USA, 2015. $\Delta u$ and $\Delta v$ represent the displacement components between two consecutive nodes. Considering the geometry of the continuum, $\Delta u$ is invariable along the continuum. However, due to the trapezoidal geometry of plate 215, see FIG. 2, $\Delta v$ is a non-uniform variable, linearly increasing along the length L of continuum 217 from base 210 to apex 212. The elastodynamic equation of the proposed ABM continuum, represented by eqn. (4), was solved using a custom-written MATLAB program. As per the boundary conditions, it was assumed that plate 215 is fixated to the lateral supports at base 210 and the two non-parallel sides 216 and 218 (i.e., legs of the trapezoid). In addition, at the freely moving side 214 (i.e., apex), the bending moment and shear force were considered to be zero. In this disclosure, our material of choice for the ABM plate was Polyvinylidene Fluoride (PVDF), the properties of which were used to solve eqn. (4). These properties as well as the geometrical dimensions are tabulated in Table II, see FIG. 12.

Finite-Element Analysis

Figure 3:
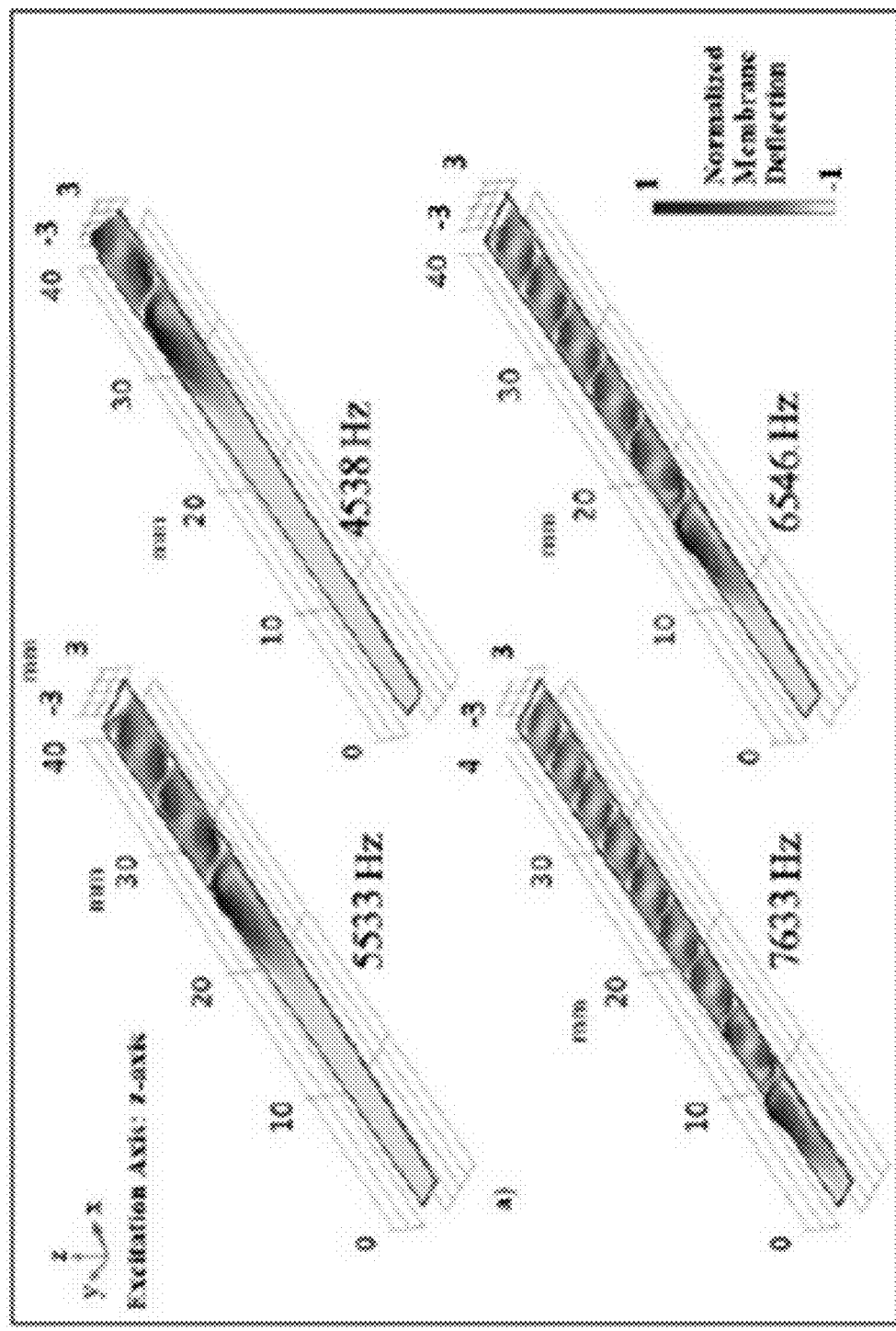
FIG. 3 shows normalized deflection patterns of a plate of the current disclosure in response to different acoustic pressure excitation frequencies.

To further investigate the proposed ABM dynamic behavior and to validate the analytical model, a finite-element analysis (FEA) was performed using COMSOL Multiphysics® employing the boundary conditions. Since this disclosure aims to verify the analytical and numerical models by fabricating a proof-of-concept prototype of the proposed ABM structure and experimental testing, the inventors chose tractable feature sizes, as summarized in Table II, see FIG. 12. For the numerical simulations, harmonic unit pressure, 1 Pa, (i.e., 94 dB sound pressure level) within the range of 1 kHz to 10 kHz was simulated to obtain numerical Green's function with unit pressure. Similarly, to obtain the transfer function and its respective factor, harmonic pressure of 20 mPa (i.e., 60 dB sound pressure level), along the frequency range of 1 kHz to 10 kHz was also applied over the top surface of the plate as the excitation input. Deflection patterns of the ABM plate were numerically analyzed at both dB levels. Deflection pattern obtained from both dB levels were normalized for comparison. It was found that the frequency dependent deflection amplitude of the plate was different at different dB levels but the deflection pattern with spatial distributions was qualitatively exactly similar. FIG. 3 shows the representative frequency dependent plots of continuum's deflection responses at four distinct oscillation frequencies (i.e., 4538 Hz, 5533 Hz, 6546 Hz, and 7633 Hz). FIG. 3 illustrates normalized deflection patterns of the plate in response to different acoustic pressure excitation frequencies. Plate 215 is suspended over trapezoidal duct 204 embedded in bottom support 202 and is fixated at every side except the apical end. The maximum localized deflection due to the low-frequency excitation occurs toward the ABM's apical end, whereas the peak deflection gradually shifts toward the base as the excitation frequency increases. This spatial shift of peak deflection is due to the fact that the bending stiffness of plate 215 is lower at apex 212 end compared to base 210 end, caused by the gradual variation of the width of plate 215 along the X-axis, even though the entire plate 215 has a constant modulus of elasticity. The vibration energy at a given frequency is distributed across the entire plate 215 but induces the largest response or the peak deflection amplitude at a single location. This happens because the local Eigenfrequency of the plate 215 matches with the excitation frequency of the pressure given to the plate.

FIG. 3 shows that along with the maximum or the peak deflection of the plate at a specific location, several trailing peaks with smaller amplitudes appeared toward the apical end. In the human cochlea, the BM is submerged in a viscous fluid, which serves as a travelling-wave medium forming a membrane-fluid interface. This interface serves as a damper that damps out the smaller deflection peaks. Damping due to the fluid-structure interaction helps attenuating the crosstalk among the frequency channels. For the sake of fabrication simplicity for this article, the proof-of-concept model was designed to function in the atmospheric medium, and a fluidic medium was ignored.

Fabrication

PDMS-PVDF Basilar Membrane Microfabrication

Figure 4:
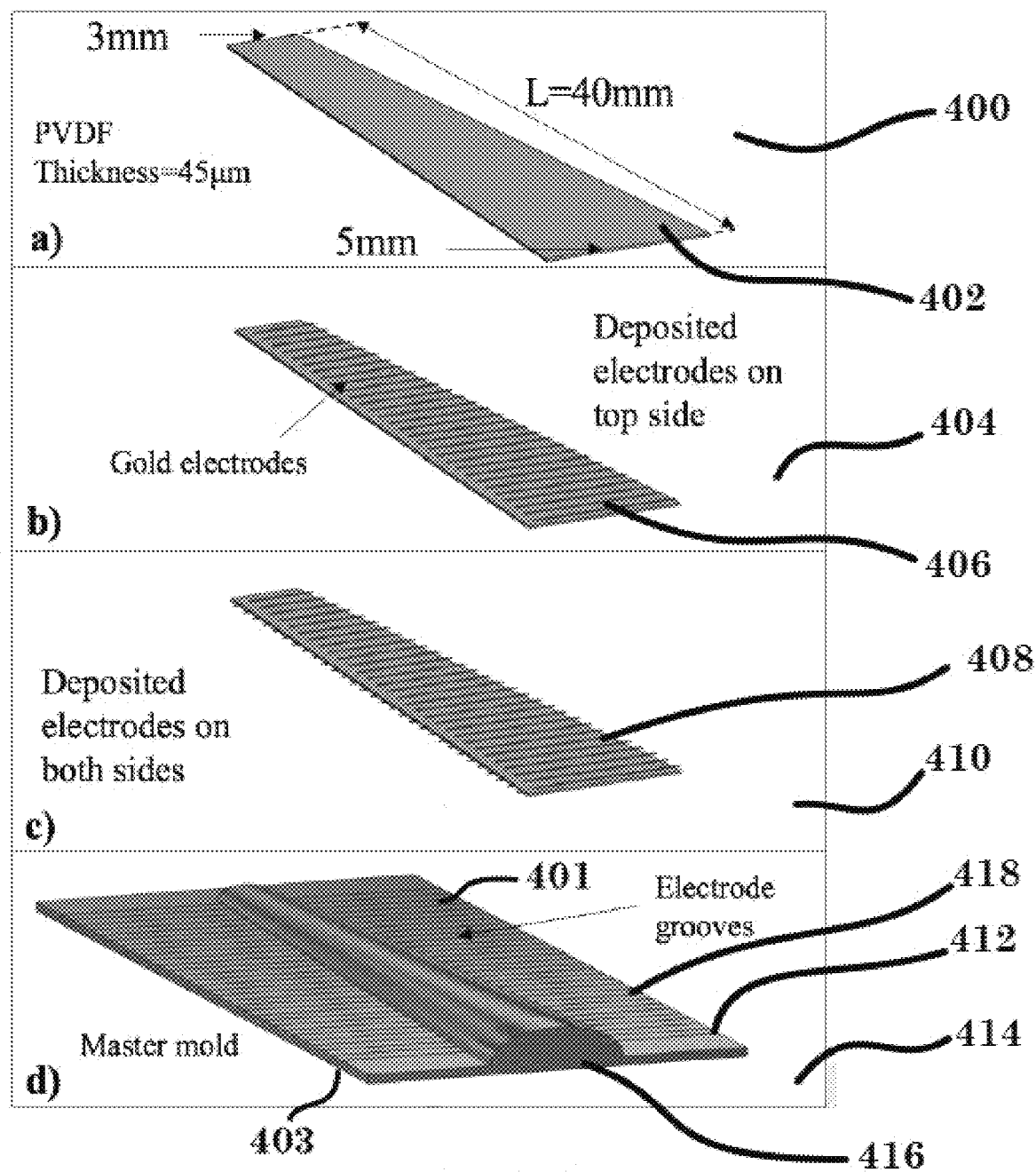
FIG. 4 shows a microfabrication process of the current disclosure.
Figure 4:
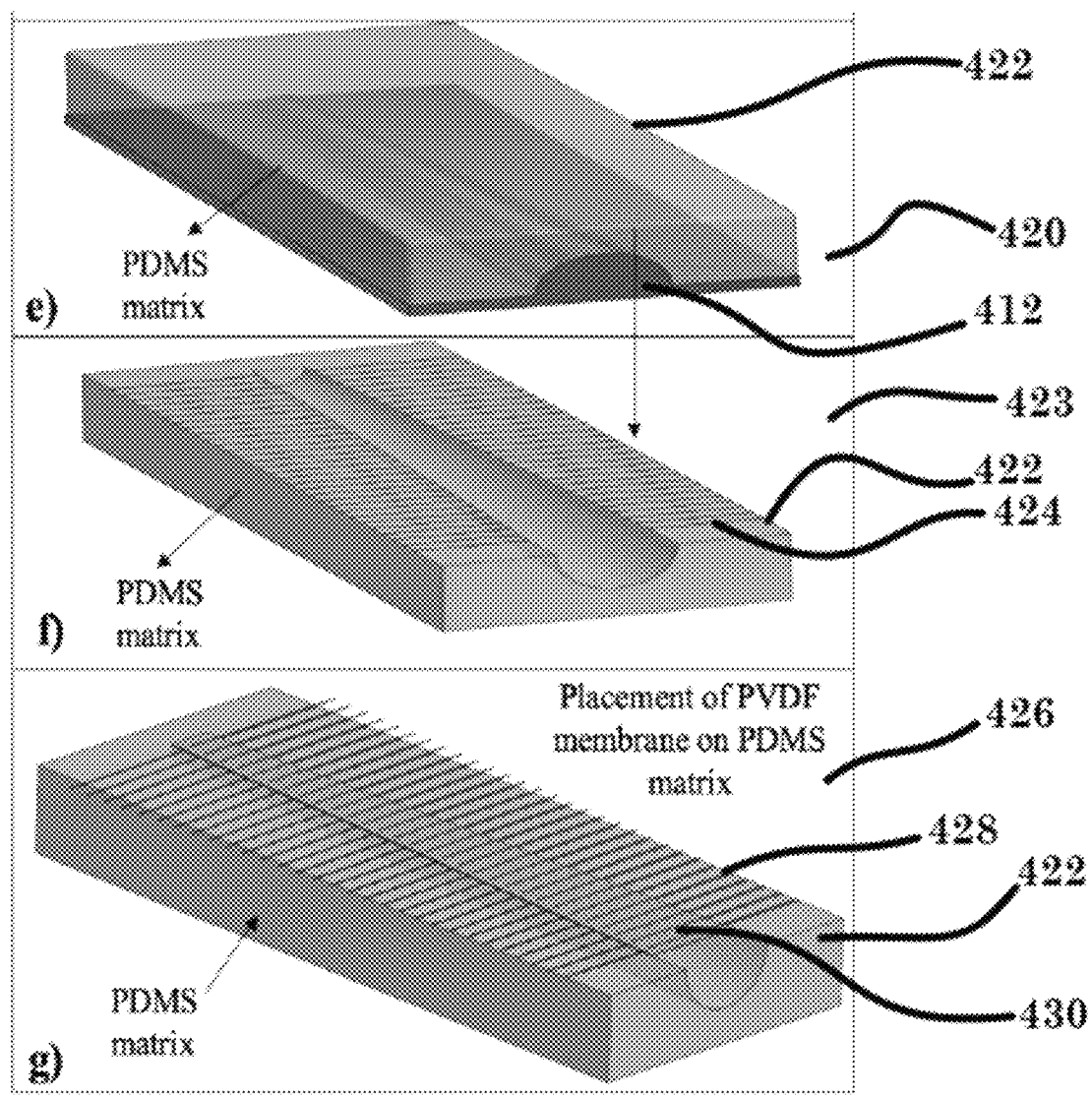

In order to experimentally investigate the functionality of our proof-of-concept ABM and validate the analytical and numerical modeling presented in the previous section, we custom-fabricated the proposed model with the dimensions summarized in Table II, see FIG. 12. The fabrication was performed in the Marcus Nanotechnology Research Center of Georgia Institute of Technology, GA, USA. FIG. 4 illustrates the microfabrication process.

In the first step 400, a PVDF thin film 402 with 45 µm thickness, purchased from PolyK Technologies, PA USA, and was precisely laser-cut into a trapezoidal substrate with an appropriate size (Table II, FIG. 12). The PVDF substrate was then sandwiched between two shadow masks and placed inside a Denton Explorer evaporator at 404, where gold electrodes 406 with 1 µm thickness were deposited onto the opposite sides 401 and 403 of the substrate at 2 Å/s rate. The pressure inside the evaporator's chamber was lowered to 3e-6 Torr for a uniform gold deposition. After removal of the shadow mask, thirty 400-µm-wide electrodes 408 were formed 410 along the length of the PVDF plate at equal distance such that the first and 30th electrodes were located near the apex and the base, respectively (see FIG. 4 at a-c). 365

Figure 5:
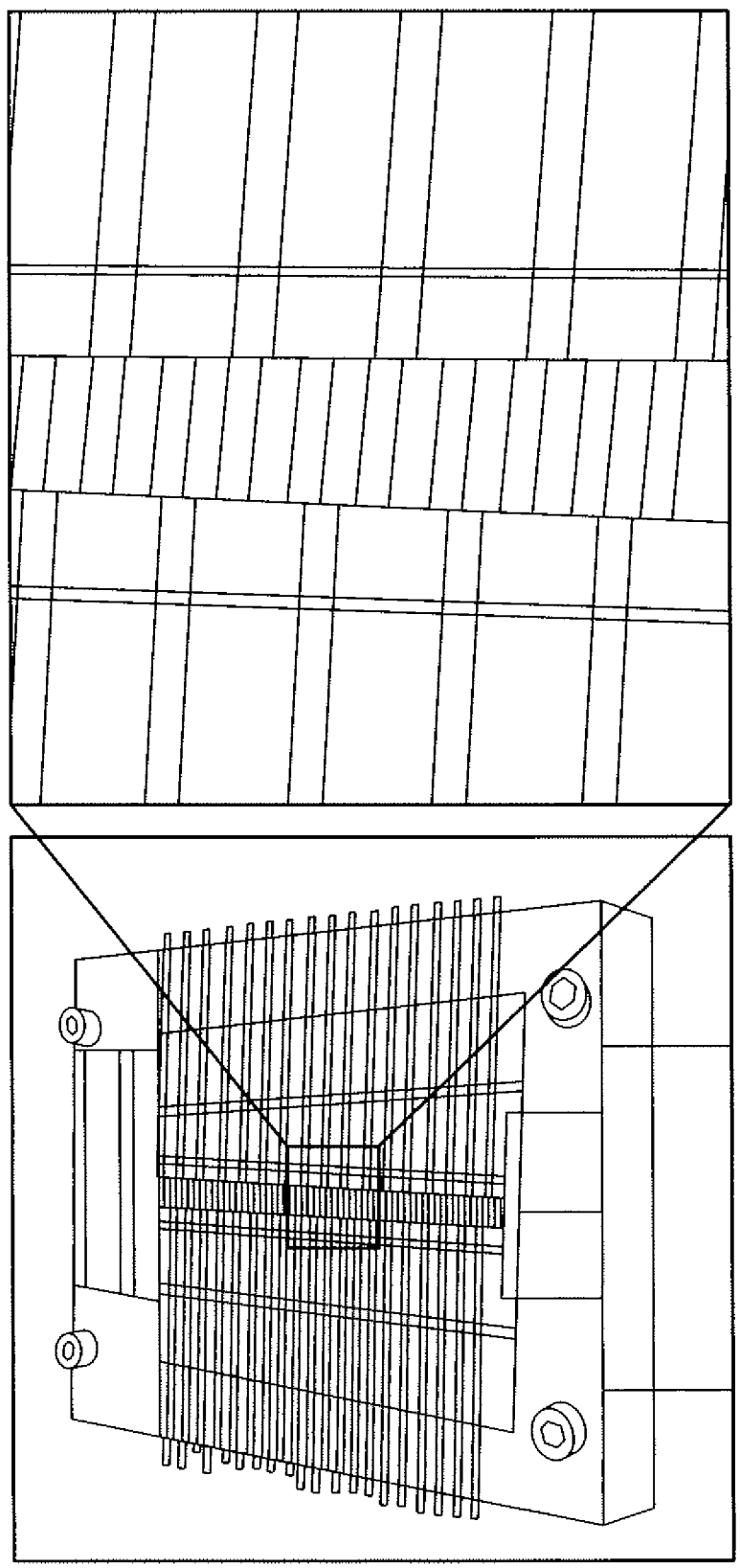
FIG. 5 shows one embodiment of a final artificial basilar membrane of the current disclosure.

Next, a Polydimethylsiloxane (PDMS) structure 412 was fabricated using soft lithography techniques 414. PDMS is serving as a support matrix for the PVDF substrate and the gold electrodes. PDMS matrix featured a duct 416 and numerous grooves 418, where the PVDF substrate and the electrodes were securely placed, respectively. To create the PDMS matrix 422, a multi-step casting process and a master mold were employed. SU-8 3025 negative photoresist was spin-coated 420 at 95° C. at 500 rpm for 10 seconds on the master mold, followed by a second spin-coating at 3000 rpm for 40 seconds. After cleaning and drying the master mold, the PDMS polymer was prepared 423. PDMS was mixed with a 1:10 ratio of a curing agent and PDMS monomers and stirred for 8 minutes. The master mold was then covered by the mixture and placed inside a convection oven to cure the PDMS matrix 422. Upon this step, the PDMS matrix contained the desired support geometry 424, including duct 416 and electrode grooves 418 (FIG. 4 at d-f). Next at 426, using a pair of tweezers and a microscope, we intricately placed thin copper wires 428 inside grooves 418 on one side of the PDMS matrix, and placed the PVDF plate 430 on top of the trapezoidal duct 416 in PDMS matrix 422 such that the edges of the bottom gold electrodes accurately lied on the tip of the copper wires filled in the grooves. Next, the grooves on the other side of the PDMS matrix were filled with the copper wires such that their tips accurately lied and matched the edges of top gold electrodes 408. Finally, a Plexiglas sheet with a trapezoidal cut-out was placed atop the structure. This sheet firmly held the gold electrodes and copper wires attached together and electrically connected, but also aided to enforce the PVDF continuum's boundary conditions (see FIG. 4 at g). The apical side of the membrane freely hung over the matrix duct, whereas the basal side along with the other two unparalleled sides were fixated to the support matrix to avoid boundary vibrations. The fabricated device using the process discussed above is shown in FIG. 5.

Experimental Setup

Figure 6:
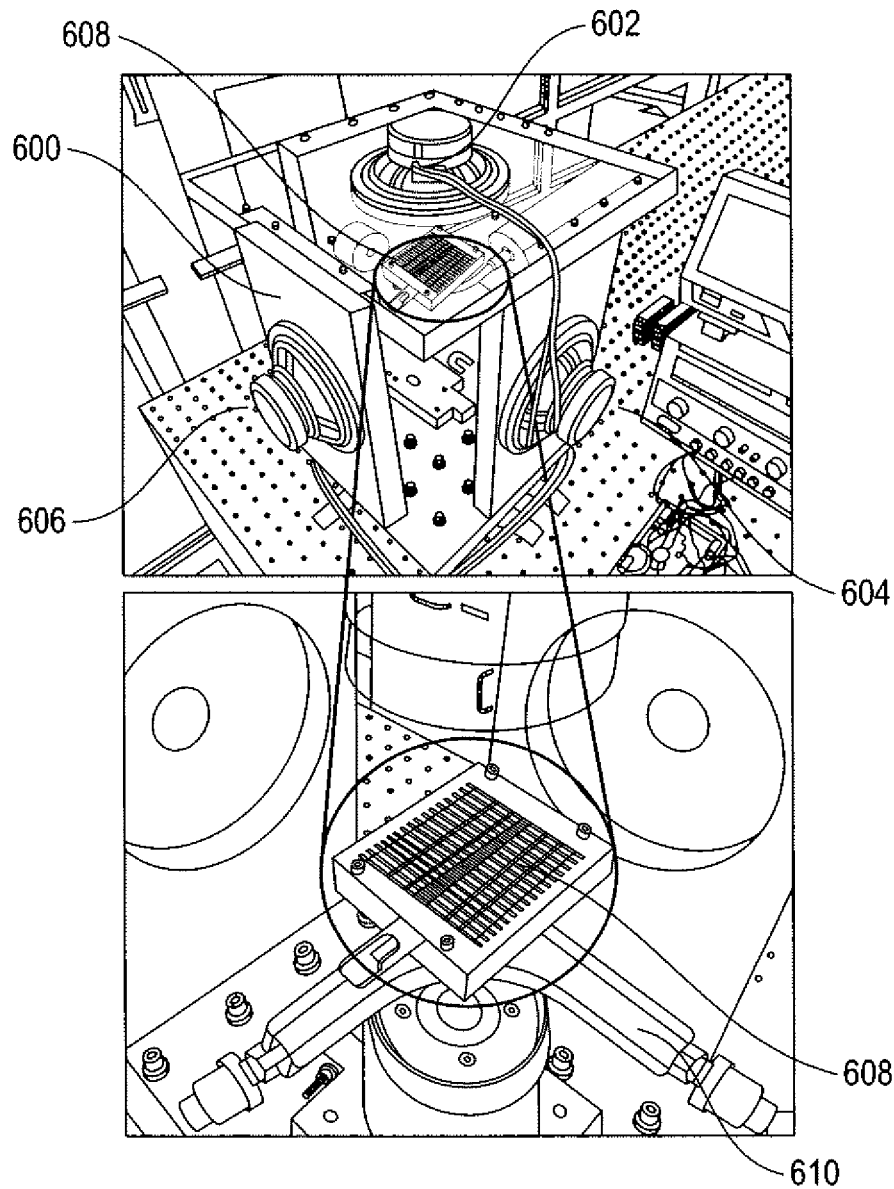
FIG. 6 shows an experimental setup of the current disclosure including the vibration exciter (top) and the work piece mount holding the fabricated device (bottom).

The next objective was to experimentally validate the functionality of the fabricated sensor and systematically characterize its performance. A vibration exciter with the capability of accurate acoustic excitation over a wide range of frequencies was used. At the University of South Carolina, in the Integrated Material Assessment and Predictive Simulation (i-MAPS) laboratory, we have designed and fabricated an Acousto-electrodynamic Vibration Exciter 600, referred to as AEVE 409 3D, which can provide precise acoustic vibration excitations over a wide frequency ranges, see M. Saadatzi, M. N. Saadatzi, R. Ahmed, and S. Banerjee, "An electrodynamic 3-dimensional vibration test bed for engineering testing," *Proc. SPIE*, Vol. 10166, April 2017, Art. No. 101660D, and consists of three powerful mechanical shakers, not shown, and three large acoustic exciters 602, 604, and 606 mounted along three Cartesian directions. In this vibration exciter, an embedded control unit generates independent sinusoidal signals with desired frequencies and amplitudes. The signals are then separately fed to each actuator. The experimental setup is shown in FIG. 6, which shows the vibration exciter (top) and the work piece mount holding the fabricated device (bottom). In this disclosure, the acoustic exciters were perpendicular to the top surface of the ABM plate (Z-axis). The plate was set to apply acoustic waves of 60 dB and 94 dB sound pressure levels, while the other two acoustic exciters and the mechanical shakers remained off. The excitation frequency was gradually varied from 1 kHz to 10 kHz. Due to the relative size of the acoustic exciter, it was assumed that the acoustic waves were uniformly distributed across the entire PVDF continuum.

To firmly mount the fabricated ABM prototype 608 at the center of the AEVE 3D's end-effector, a custom-made holder 610 was designed and attached. Experimental data were collected in an acoustically isolated room. It should be noted that the thickness of the PVDF membrane of our first prototype is 45 µm. Considering the thickness of the membrane, 60 dB sound level was low and sensor response was inconclusive with low signal to noise ratio (SNR <~20 dB)). However, when the sound pressure level was increased to 94 dB the SNR was more than 45 dB and was acceptable for further analysis. However, 45 µm thick PVDF membrane was suitable for sound above ~58 dB with 25 dB SNR which is considered suitable for speech recognition. Such case never arises in the numerical data presented in FIG. 3, because in numerical results no inherent noise existed. Hence, this concludes that a PVDF membrane with lower thickness (<45 µm) could be excited with lower sound pressure levels. Since the material utilized to fabricate the sensors in the current research has 45 µm thickness, it cannot be properly excited with low pressure levels. For a realistic artificial cochlea where lower sound pressure level is inevitable, much thinner PVDF should be used.

Data Acquisition System

To measure the output signal from each individual electrode, a custom-made multi-channel, ultra-fast, ultra-high precision data acquisition system (DAQ) was developed. The DAQ employs an analog-to-digital converter (ADC) from Texas Instruments (i.e., DDC2256A), a signal conditioning stage, an instrumentation amplification stage, and a power management system. The DDC2256A is a 24-bit, multi-channel ADC which allows up to 256 individual sensors be sampled and digitized simultaneously at very high sampling rates, which is particularly compatible with the low-voltage, high frequency nature of typical signals acquired in this application. Upon sampling and digitization of the outputs from the ABM electrodes, the resulting data were sent to a single low-voltage differential signaling (LVDS) serial interface. The 462 LVDS interface is specifically suitable for this application as it minimizes the noise coupling in this multi-channel data acquisition application to enhance SNR. Furthermore, the signal-conditioning and amplification stages accommodate signal filtration and also regulates supply voltages required for the proper functioning of the DAQ. Upon receiving the readings from the ABM sensor to the micro-processing unit, online data processing and digital filtration techniques were employed. This was followed by relaying the processed data stream to a computer through high-speed USB port for analysis and visualization.

Experimental Testing and Results

Figure 7:
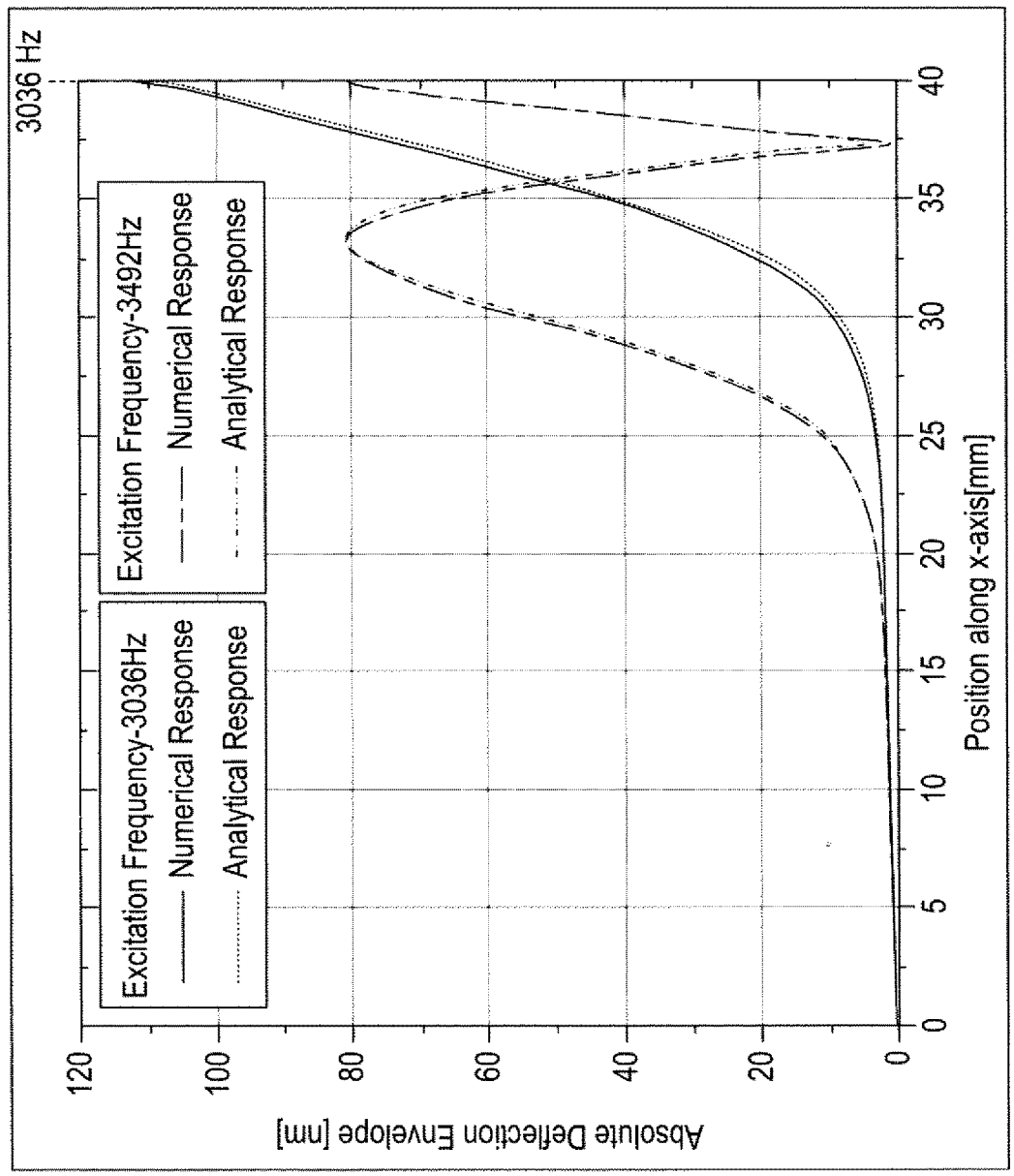
FIG. 7 shows an envelope of absolute deflection along the X-axis in response to acoustic excitation frequencies of (a) 3036 Hz and 3492 Hz, (b) at 4650 Hz, and (c) deflection pattern at 8059 Hz.
Figure 8:
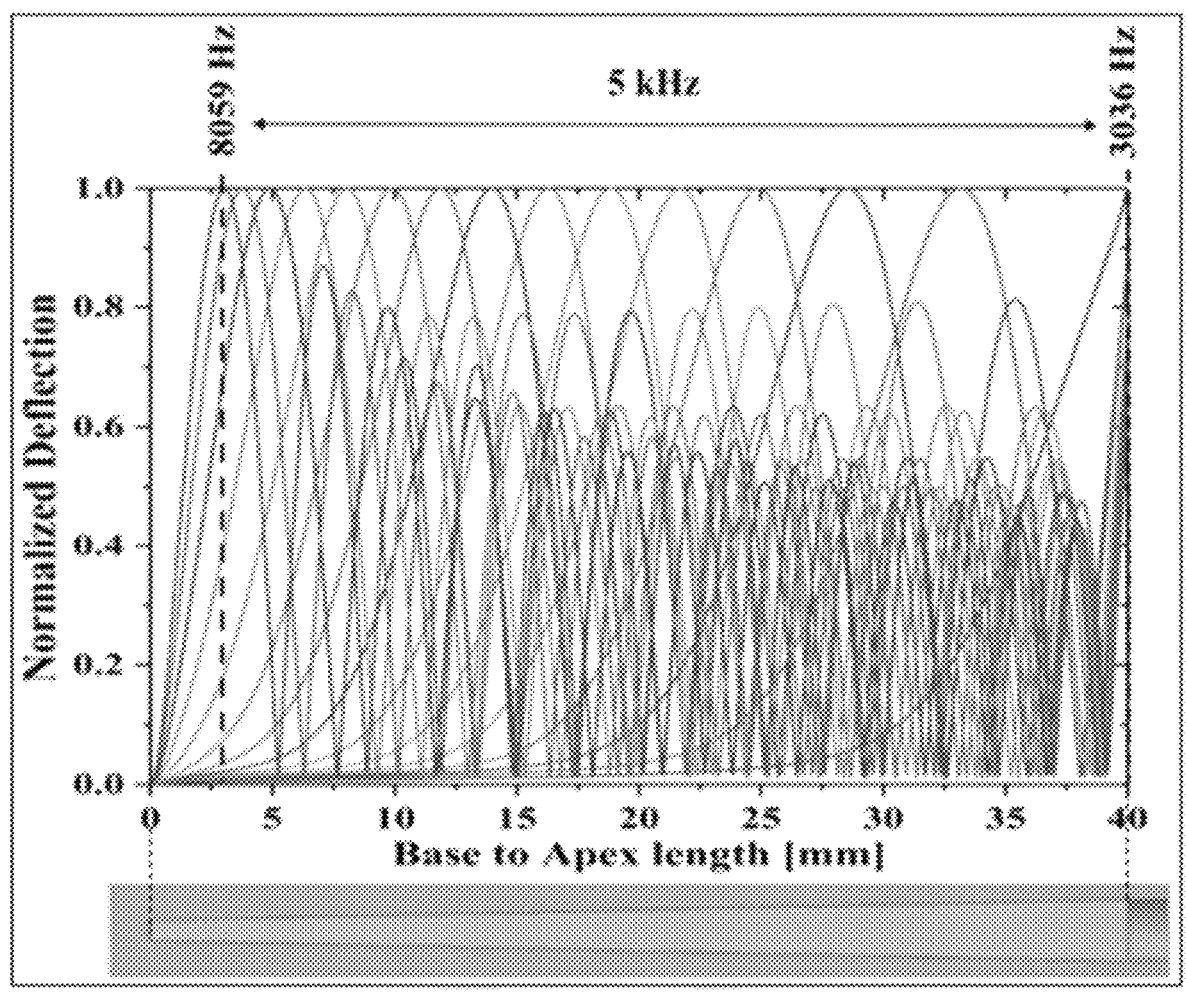
FIG. 8 shows superposition of the responses from ABM between the frequency range 3036 Hz and 8059 Hz.
Figure 9:
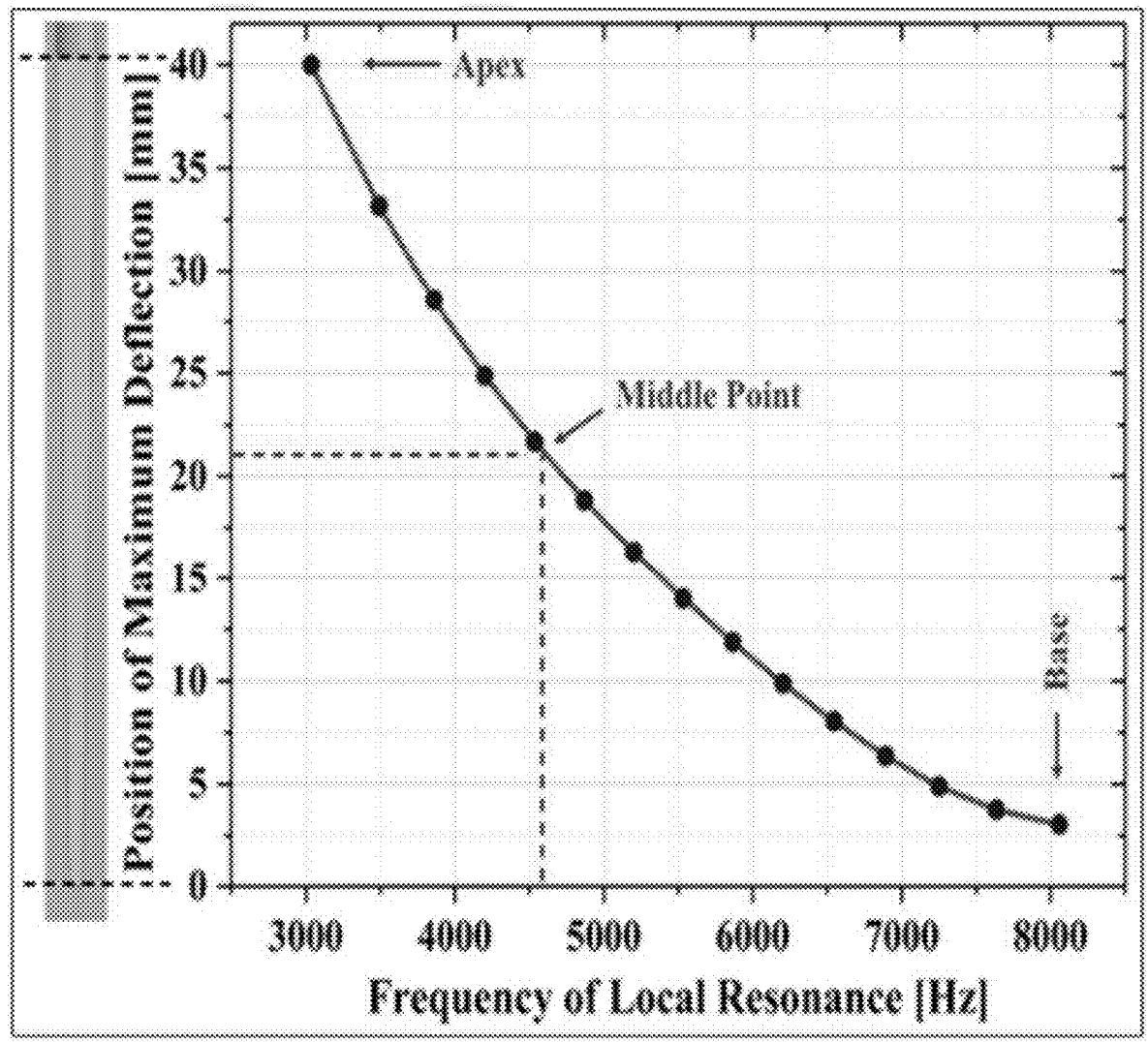
FIG. 9 shows the location of the maximum deflection peak in response to acoustic excitations with varying frequencies.

The frequency response varies following the ABM's geometric configuration and material properties discussed herein. Due to the limitations in our fabrication facility, the oversized geometric configuration reported in Table II, see FIG. 12, was implemented but is sufficient to present a proof-of-concept. The same ABM was then analytically and numerically analyzed using the model presented herein. To solve the elastodynamic analytical equation (eqn. (4)), in this article, a uniform plate thickness of 45 µm was assumed for the ABM plate. The analytical and numerical results, presented in FIG. 7, which shows the envelope of absolute deflection along the X-axis in response to acoustic excitation frequencies of (a) 3036 Hz and 3492 Hz, (b) at 4650 Hz, and (c) deflection pattern at 8059 Hz, illustrates that the location of the peak responses at different frequencies changes from 3036 Hz to 8059 Hz along the ABM longitudinal axis, i.e., from the 5 mm-wide apex region to the 3 mm-wide base regions of the ABM, respectively. In FIG. 7, peak responses at four representative frequencies are plotted. The frequencies cause the ABM to locally resonate at ~2.5 mm, —21 mm, —33 mm and ~40 mm distance from the base end, at frequencies 8059 Hz, 4650 Hz, 3492 Hz, and 3036 Hz, respectively. FIG. 7 at a shows that at the lower frequency range, i.e., —3000-4000 Hz, the maximum localized deflection of the continuum appears toward the apical side. On the other hand, as shown in FIG. 7 at b, the peak deflection moved towards the basal end peaked near 21 mm from base at ~4650 Hz frequency. At much higher frequency range, i.e., —8000 Hz, FIG. 7 at c shows that the maximum localized deflection occurs in the vicinity of the basal end of the continuum. FIG. 7 at b and c also depict the trailing peaks observed in FIG. 3. Comparing the analytical and numerical results in FIG. 7, it can be seen that the analytical and FEA results are in very close agreement. However, the analytical simulations are computationally more tractable, and an order of magnitude faster as compared to the FEA simulations. This computational efficiency is particularly useful in the optimal design of future ABMs, for instance, optimization of geometric and material parameters of ABMs through evolutionary algorithms, which may involve millions of simulation iterations. FIG. 8 shows the superposition of the responses from the ABM in the frequency range of 3036 Hz to 8059 Hz. Utilizing the responses in FIG. 8, FIG. 9 shows how the position of maximum deflection with respect to the excitation frequency has changed along the length of the ABM. It can be seen that the spatial location of the maximum deflection along the ABM shifts toward the apical end as the excitation frequency increases. This observation confirms the possibilities of selection of the desired spatial frequency and mapping of the proposed ABM structure, which were inspired from the biological basilar membrane. This characteristic is in accordance with the behavior expected from the proposed structure as the bending stiffness of the plate becomes larger from the apex toward the base, which is due to the gradual growth in the width of the ABM plate, even though a constant modulus of elasticity was defined for the entire plate.

Figure 10:
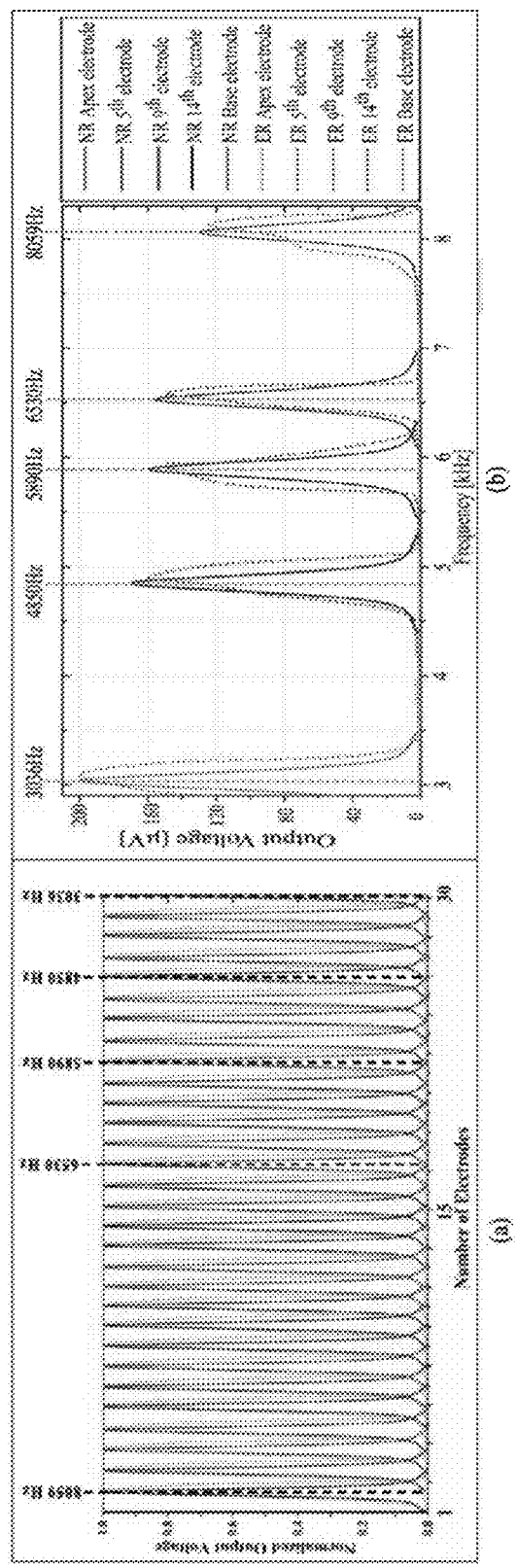
FIG. 10 shows at (a) responses of the voltage outputs obtained from individual electrodes; and at (b) actual voltage output ($\mu V$) as the frequency responses at 1st, 5th, 9th, 14th and 30th electrode, comparing the numerical responses (NR) from multi-physics FEA simulation and experimental responses (ER) from a fabricated ABM of the current disclosure.

FIG. 10 shows at (a) responses of the voltage outputs obtained from individual electrodes and at (b) Actual voltage output ($\mu V$) as the frequency responses at 1st, 5th, 9th, 14th and 30th electrode, compares the numerical responses (NR) from multi-physics FEA simulation and experimental responses (ER) from fabricated ABM. FIG. 10 at a depicts the normalized numerical response (NR) and experimental response (ER) at the respective locations of the electrodes. In order to compare the actual voltage outputs and avoid overcrowded responses, FIG. 10 at b shows the numerical response (NR) and experimental response (ER) at a few representative electrodes (from base end no. 1st, 5th, 9th, 14th & 30th electrode) in terms of output voltages ($\mu V$) 534 measured through empirical testing as well as multi-physics FEA simulations. Results show that the maximum output voltage of the PVDF continuum at ~3 kHz is detected by the electrode deposited at the apex side, while the maximum output response, at ~8 kHz, is observed by the base electrode.

Additionally, FIG. 10 at b shows the voltage output of three other electrodes located at three different places (5th, 9th and 14th electrode) on the continuum. According to FIG. 10, the resonance amplitudes also depend on the position along the x-axis, along with the spatial shift in the resonance frequencies. As depicted, with larger x, amplitude of deflection decreases, which is mainly due to the asymmetric boundary conditions on the opposite sides of the continuum (i.e., the freely oscillating apex vs. the fixated base).

Comparing the numerical and experimental output voltages in FIG. 10, it can be seen that they are in close agreement, although there is a minor shift in resonance frequencies and variation in resonance amplitudes. This small discrepancy might be due to a number of facts. First, because of the negligible thickness of gold electrodes as compared to that of the PVDF continuum, we did not consider the effects of gold electrodes deposited on the PVDF plate in our FEA simulations. A number of other factors may have also contributed to this discrepancy, such as human error during fabrication, ambient temperature, and gradual degradation and material aging in the fabricated prototype.

The proposed ABM model in this disclosure demonstrated tonotopic characteristics within the operational frequency range of 3-8 kHz, which only partially covers the audible frequency band. One reason for this selection of a representative smaller frequency band is that the gradient of the stiffness of the PVDF membranes along the x-axis over a smaller footprint of ABM (40 mm long) is insufficient to cover a large frequency band. In the current model, the apical end is only 66.7% wider that than the basal end. This ratio in a human basilar membrane is approximately six, see E. G., Wever, "II the width of the basilar membrane in Man," Ann. Otol., Rhinol. Laryngol., Vol. 47, No. 1, pp. 37-47, March 1938, giving a logarithmic variation of width and material properties, which was beyond the scope and capabilities of this disclosure. However, with appropriate material system where K(x,y) in Eq. 1 could be varied in a logarithmic pattern, an ABM can be implemented that can comprehend frequency range between 20 Hz-20 kHz within a smaller footprint. In other embodiments, membranes with larger gradient stiffness may be employed to broaden the ABM's bandwidth and extend the tonotopy to the entire audible frequency range. Along with modifying the membrane's width at its apex and base, modulating the membrane's material properties (e.g., thickness and mass) along the x-axis can enhance the stiffness gradient and, thus, the frequency range.

Additionally, FIG. 10 shows that the generated electric potential signals in our ABM are very small (less than 200 $\mu v$), although the ABM was exposed to relatively loud acoustic input of 94 dB. These responses were even smaller when acoustic input was 60 dB. In a functional cochlear implant, the ABM's output signals will have to be amplified to properly stimulate nerve cells for acoustic waves at the human hearing thresholds. Potential solutions for the amplification include usage of integrated electronic amplifiers, as well as thinner piezoelectric membranes that generates larger mechanical deflection to a lower acoustic excitation.

In this disclosure, a continuum artificial basilar membrane (ABM) with an array of electrodes with longitudinal coupling, inspired from the structure of a human basilar membrane, was proposed. The proposed ABM incorporated a PVDF trapezoidal continuum with an array of gold electrodes distributed across its top and bottom surfaces, as well as a PDMS support matrix with a longitudinal duct and electrode grooves. The current disclosure developed analytical and numerical models for the proposed structure and verified its functionality through fabrication of a proof-of-concept prototype and experimental testing. The ABM developed in this disclosure demonstrated spatial frequency selectivity and mapping along its longitudinal axis, mimicking its real-life counterpart, and converted the acoustic stimulations to electric potential without an external power source.

Figure 13:
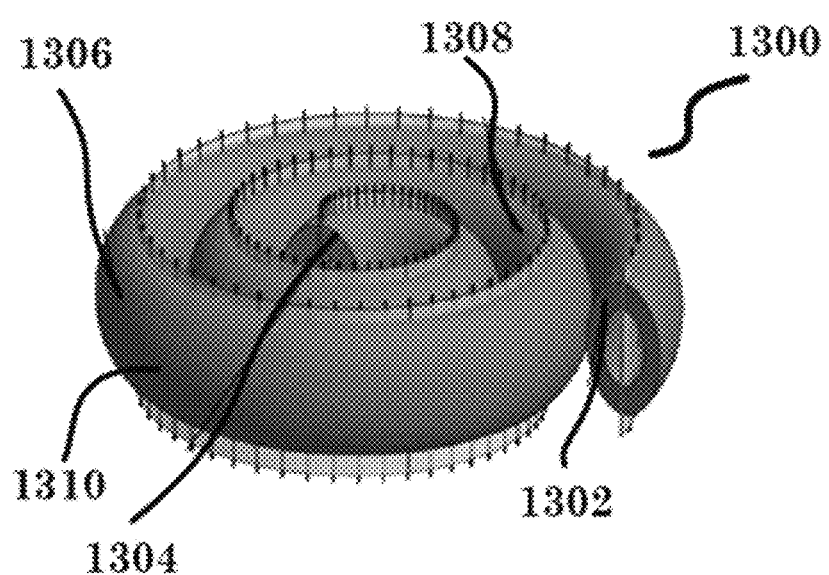
FIG. 13 shows one embodiment of a cochlear implant of the current disclosure.

FIG. 13 shows one embodiment of a cochlear implant 1300 of the current disclosure with cochlear apex 1302, cochlear base 1304, PDMS base Scale tympani 1306, and PDMS base Scale vestibuli 1308. This embodiment shows the cochlear implant described herein in a coiled formation 1310 for space saving/size constraint purposes.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A bioinspired acoustic bandpass sensor comprising:
at least one sensor array defining a geometric structure formed to mimic a basilar membrane of a subject;
the geometric structure comprising:
at least one electrode fabricated on opposite surfaces of a piezoelectric continuum; and
the piezoelectric continuum comprising a trapezoidal geometry atop an elastomer matrix defining at least one embedded electrode groove to contain the at least one electrode and a duct.

2. The bioinspired acoustic bandpass sensor of claim 1, wherein the subject is a human.

3. The bioinspired acoustic bandpass sensor of claim 1, wherein the bioinspired acoustic bandpass sensor captures infrasonic, sonic, and ultrasonic waves.

4. The bioinspired acoustic bandpass sensor of claim 1, wherein the bioinspired acoustic bandpass sensor captures only at least one user selected frequency.

5. The bioinspired acoustic bandpass sensor of claim 1, wherein the bioinspired acoustic bandpass sensor is a plate type model or a beam type model.

6. The bioinspired acoustic bandpass sensor of claim 1, wherein the geometric structure enables the bioinspired acoustic bandpass sensor to function as a linear transmission line with a traveling-wave behavior.

7. The bioinspired acoustic bandpass sensor of claim 1, wherein the piezoelectric continuum defines a graded stiffness along a longitudinal structure of the piezoelectric continuum via the trapezoidal geometry forming a tapered geometry that varies at least one mechanical boundary condition.

8. The bioinspired acoustic bandpass sensor of claim 1, wherein vibration energy at a given frequency is distributed across the geometric structure but induces peak deflection amplitude at a single location.

9. The bioinspired acoustic bandpass sensor of claim 8, wherein spatial shift of peak deflection is due to a bending stiffness of the geometric structure differing between an apex end and a base end caused by gradual variation of a width of the geometric structure along an X-axis.

10. The bioinspired acoustic bandpass sensor of claim 1, wherein the bioinspired acoustic bandpass sensor defines a coiled shape.

11. A method of making a bioinspired acoustic bandpass sensor comprising:
forming at least one sensor array defining a geometric structure to mimic a basilar membrane of a subject;
forming the geometric structure to comprise:
at least one electrode fabricated on opposite surfaces of a piezoelectric continuum; and
forming the piezoelectric continuum to define a trapezoidal geometry atop an elastomer matrix defining at least one embedded electrode groove to contain the at least one electrode and a duct.

12. The method of making a bioinspired acoustic bandpass sensor of claim 11, further comprising mimicking the basilar membrane of a human.

13. The method of making a bioinspired acoustic bandpass sensor of claim 11, further comprising forming the bioinspired acoustic bandpass sensor to capture infrasonic, sonic, and ultrasonic waves.

14. The method of making a bioinspired acoustic bandpass sensor of claim 11, further comprising forming the bioinspired acoustic bandpass sensor to capture only at least one user selected frequency.

15. The method of making a bioinspired acoustic bandpass sensor of claim 11, defining the bioinspired acoustic bandpass sensor to define a plate type model or a beam type model.

16. The method of making a bioinspired acoustic bandpass sensor of claim 11, further comprising defining the geometric structure to function as a linear transmission line with a traveling-wave behavior.

17. The method of making a bioinspired acoustic bandpass sensor of claim 11, further comprising forming the piezoelectric continuum to define a graded stiffness along a longitudinal structure of the piezoelectric continuum via the trapezoidal geometry forming a tapered geometry that varies at least one mechanical boundary condition.

18. The method of making a bioinspired acoustic bandpass sensor of claim 11, further comprising defining the geometric structure so that vibration energy at a given frequency is distributed across the geometric structure but induces peak deflection amplitude at a single location.

19. The method of making a bioinspired acoustic bandpass sensor of claim 18, further comprising defining the geometric structure wherein spatial shift of peak deflection is due to a bending stiffness of the geometric structure differing between an apex end and a base end caused by gradual variation of a width of the geometric structure along an X-axis.

20. The method of making a bioinspired acoustic bandpass sensor of claim 11, further comprising forming the bioinspired acoustic bandpass filter into a coiled shape.

* * * * *